United States Patent
Kobayashi et al.

(10) Patent No.: US 11,500,386 B2
(45) Date of Patent: Nov. 15, 2022

(54) CONTROL APPARATUS, CONTROL METHOD, PROGRAM, AND MOBILE OBJECT

(71) Applicant: Sony Corporation, Tokyo (JP)

(72) Inventors: Dai Kobayashi, Tokyo (JP); Takamori Yamaguchi, Tokyo (JP); Ryo Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 213 days.

(21) Appl. No.: 16/645,174

(22) PCT Filed: Sep. 4, 2018

(86) PCT No.: PCT/JP2018/032699
§ 371 (c)(1),
(2) Date: Mar. 6, 2020

(87) PCT Pub. No.: WO2019/054230
PCT Pub. Date: Mar. 21, 2019

(65) Prior Publication Data
US 2021/0026356 A1    Jan. 28, 2021

(30) Foreign Application Priority Data

Sep. 15, 2017   (JP) .............................. JP2017-177753

(51) Int. Cl.
*G05D 1/02* (2020.01)
*G05D 1/00* (2006.01)
*H04W 4/40* (2018.01)

(52) U.S. Cl.
CPC ......... *G05D 1/0212* (2013.01); *G05D 1/0088* (2013.01); *G05D 1/0246* (2013.01); *G05D 2201/0213* (2013.01); *H04W 4/40* (2018.02)

(58) Field of Classification Search
CPC .. G05D 1/0212; G05D 1/0088; G05D 1/0246; G05D 2201/0213; G01S 17/931;
(Continued)

(56) References Cited

U.S. PATENT DOCUMENTS

| | | | |
|---|---|---|---|
| 7,689,311 B2 * | 3/2010 | Rumi | G06Q 10/06 703/2 |
| 2006/0212188 A1 * | 9/2006 | Kickbusch | B61L 27/10 701/19 |

(Continued)

FOREIGN PATENT DOCUMENTS

| | | |
|---|---|---|
| JP | H06-180235 A | 6/1994 |
| JP | 2008-158868 A | 7/2008 |

(Continued)

OTHER PUBLICATIONS

International Search Report and Written Opinion dated Nov. 21, 2018 in connection with International Application No. PCT/JP2018/032699.

(Continued)

*Primary Examiner* — Alexander G Kalinowski
*Assistant Examiner* — Sanjeev Malhotra
(74) *Attorney, Agent, or Firm* — Wolf, Greenfield & Sacks, P.C.

(57) ABSTRACT

An action plan is generated even when the own position is unknown in order to move autonomously. A route is planned for each position constituting an own-position candidate on the basis of status of surroundings. Multiple candidates of an action plan constituting multiple action candidates are generated on the basis of the planned routes. An evaluation value is set to each of the generated multiple action plan candidates. The action plan is determined using the action plan candidates in accordance with their evaluation values. This technology is applied advantageously to multi-legged (Continued)

robots, flying objects, and onboard systems each controlled by an onboard computer to move autonomously.

18 Claims, 16 Drawing Sheets

(58) Field of Classification Search
CPC ...... G01C 21/34; G06Q 10/10; G06Q 10/047; G06Q 10/08; G06Q 10/063
USPC ........... 701/19, 25, 119, 532, 533, 122, 540; 705/4, 37; 700/103; 703/2
See application file for complete search history.

(56) References Cited

U.S. PATENT DOCUMENTS

| | | | | |
|---|---|---|---|---|
| 2008/0183506 A1* | 7/2008 | Mamorsky | ............. | G06Q 40/08 705/37 |
| 2009/0240424 A1* | 9/2009 | Hayes-Roth | ..... | G06Q 10/06315 701/122 |
| 2010/0228574 A1* | 9/2010 | Mundinger | .......... | G06Q 10/047 701/532 |
| 2010/0280748 A1* | 11/2010 | Mundinger | ........ | G01C 21/3438 701/532 |
| 2014/0278095 A1* | 9/2014 | Kaehler | ................ | B60W 30/10 701/540 |
| 2014/0309835 A1* | 10/2014 | Yamamoto | ........... | G06Q 10/047 701/25 |
| 2017/0123429 A1* | 5/2017 | Levinson | ................ | G01C 21/34 |
| 2017/0147003 A1* | 5/2017 | Karlsson | ................... | G06T 7/70 |

FOREIGN PATENT DOCUMENTS

| | | | | |
|---|---|---|---|---|
| JP | 2014-123306 A | | 7/2014 | |
| JP | 2016-009354 A | | 1/2016 | |
| JP | 2016009354 A | * | 1/2016 | .......... G05D 1/0291 |
| JP | 2016-048464 A | | 4/2016 | |
| JP | 2016048464 A | * | 4/2016 | .......... G01S 3/8083 |
| JP | 2016-218673 A | | 12/2016 | |
| JP | 2017161284 A | | 9/2017 | |

OTHER PUBLICATIONS

International Preliminary Report on Patentability dated Mar. 26, 2020 in connection with International Application No. PCT/JP2018/032699.

* cited by examiner

CONTROL APPARATUS, CONTROL METHOD, PROGRAM, AND MOBILE OBJECT

CROSS-REFERENCE TO RELATED APPLICATIONS

This application claims the benefit under 35 U.S.C. § 371 as a U.S. National Stage Entry of International Application No. PCT/JP2018/032699, filed in the Japanese Patent Office as a Receiving Office on Sep. 4, 2018, which claims priority to Japanese Patent Application Number JP2017-177753, filed in the Japanese Patent Office on Sep. 15, 2017, each of which is hereby incorporated by reference in its entirety.

TECHNICAL FIELD

The present disclosure relates to a control apparatus, a control method, a program, and a mobile object. More particularly, the disclosure relates to a control apparatus, a control method, a program, and a mobile object involving the use of a computer to generate action plans to achieve autonomous movement even in the situation where the own position is unknown.

BACKGROUND ART

To achieve autonomous movement of a mobile object such as a robot requires recognizing or estimating the own position of the mobile object as the starting point from which to plan actions. Under this requirement, techniques have been proposed which use sensors and other means for recognizing status of the own surroundings in order to estimate the own position and to plan autonomous movement accordingly.

For example, techniques have been proposed to control a first action and a second action by taking into consideration multiple possibilities of direct or reflected sound sources from the sounds of surroundings (see PTL 1).

Also, techniques have been proposed to control actions on the basis of a single value function that represents the appropriateness of actions of multiple robots (see PTL 2).

CITATION LIST

Patent Literature

PTL 1: JP 2016-048464A
PTL 2: JP 2016-009354A

SUMMARY OF INVENTION

Technical Problem

The above-mentioned techniques are each designed to plan and control multiple actions. The techniques are intended for specifically defined use circumstances such as estimation of sound sources and control of multiple robots. However, there have been few techniques dealing with the control of situations where the own position is unknown.

That is, in situations where the own position is unknown, such as immediately after power-up, immediately after collision with a person or with an obstacle, after lifting by the user, or false recognition of the surrounding environment, the mobile object could only move in a random manner or by assuming predetermined circumstances.

Also, arrangements to generate action plans of the mobile object in recent years typically do so by retaining the most recent information and making predictions using that information. However, in situations where there is no past information or where the information regarding the latest own position is unclear, uncertain, or nonexistent (absent), it has been impossible to generate any action plan.

The present disclosure has been made under the above circumstances. An object of the disclosure is to generate action plans and perform autonomous actions accordingly, particularly in situations where the own position is unknown.

Solution to Problem

According to one aspect of the present disclosure, there is provided a control apparatus including an action plan candidate generating section configured to generate multiple candidates of an action plan constituting multiple action plan candidates on a basis of status of surroundings, an action plan candidate evaluating section configured to assign an evaluation value to each of the generated multiple action plan candidates, and an action plan determining section configured to determine the action plan using the multiple action plan candidates on a basis of the multiple action plan candidates and the evaluation values thereof.

The action plan candidate generating section may generate a candidate of the action plan constituting an action plan candidate for each position estimated as an own position candidate on the basis of the status of surroundings.

The action plan candidate evaluating section may assign an evaluation value to each of the generated multiple action plan candidates on a basis of a degree of probability of the position estimated as an own position candidate on the basis of the status of surroundings.

The own position estimated on the basis of the status of surroundings may be done so by matching feature points acquired from a camera-captured image against a preliminary knowledge. The degree of probability of the position may be defined by the number of matched feature points.

The action plan determining section may further include a selection section configured to select one of the multiple action plan candidates on a basis of the evaluation values thereof. The action plan determining section may determine as the action plan the action plan candidate selected by the selection section.

The selection section may select the action plan candidate having the best evaluation value from the multiple action plan candidates on the basis of the evaluation values thereof. The action plan determining section may determine as the action plan the action plan candidate selected by the selection section.

The action plan determining section may further include a merging section configured to merge the multiple action plan candidates on the basis of the evaluation values thereof. The action plan determining section may determine as the action plan the action plan candidate obtained by the merging section merging the multiple action plan candidates.

Given elements of coordinates defining passing points forming paths that constitute the multiple action plan candidates, the merging section may merge the multiple action plan candidates into a new action plan candidate having a path moving through new passing points each being a position of center of gravity obtained by weighting each of the elements with the corresponding evaluation value. The action plan determining section may determine as the action plan the new action plan candidate thus generated by the merging section merging the multiple action plan candidates.

The action plan determining section may calculate a degree of divergence between the multiple action plan candidates and, in accordance with the degree of divergence, determine the action plan using the multiple action plan candidates on the basis of the evaluation values thereof.

The action plan determining section may further include a selection section configured to select one of the multiple action plan candidates on the basis of the evaluation values thereof, a merging section configured to merge the multiple action plan candidates on the basis of the evaluation values thereof, and a divergence degree determining section configured to calculate a degree of divergence between the multiple action plan candidates and, in accordance with the degree of divergence, determine whether one of the multiple action plan candidates is to be selected on the basis of the evaluation values thereof by the selection section, or the multiple action plan candidates are to be merged on the basis of the evaluation values thereof, in order to determine the action plan.

In the case where the multiple action plan candidates are each represented by a vector, the divergence degree determining section may calculate a difference between weighted vectors as the degree of divergence.

The divergence degree determining section may normalize magnitudes of the vectors representing the multiple action plan candidates, before calculating the difference between the weighted vectors as the degree of divergence.

In the case where the action plan candidates are each formed by a path moving through multiple passing points, the divergence degree determining section may form vectors between the passing points and, using the vectors thus formed, calculate a difference between weighted vectors as the degree of divergence.

In the case where the action plan candidates are each formed by a path moving through multiple passing points, the divergence degree determining section may calculate a sum of differences in distance between the passing points as the degree of divergence.

The action plan determining section may further include a valid action plan candidate determining section configured to determine, from among the multiple action plan candidates, a valid action plan candidate satisfying a predetermined condition. The divergence degree determining section may calculate a degree of divergence between the valid action plan candidates from among the multiple action plan candidates and, in accordance with the degree of divergence, determine whether one of the valid action plan candidates is to be selected on the basis of the evaluation values thereof by the selection section, or the multiple valid action plan candidates are to be merged on the basis of the evaluation values thereof, in order to determine the action plan.

Given the multiple action plan candidates, the valid action plan candidate determining section may determine, as a valid action plan candidate satisfying the predetermined condition, an action plan candidate for which a predetermined time period has elapsed after the generation of the action plan candidate was started by the action plan candidate generating section.

Given the multiple action plan candidates, the valid action plan candidate determining section may determine an action plan candidate having a predetermined degree of probability as a valid action plan candidate satisfying the predetermined condition.

The control apparatus may further include a route plan generating section configured to generate a route plan to a destination from each position constituting an own-position candidate on the basis of the status of surroundings. The action plan candidate generating section may generate a candidate of the action plan constituting an action plan candidate on a basis of the route plan generated with respect to each position constituting an own-position candidate.

According to another aspect of the present disclosure, there is provided a control method including an action plan candidate generating process configured to generate multiple candidates of an action plan constituting multiple action plan candidates on a basis of status of surroundings, an action plan candidate evaluating process configured to assign an evaluation value to each of the generated multiple action plan candidates, and an action plan determining process configured to determine the action plan using the multiple action plan candidates on a basis of the multiple action plan candidates and the evaluation values thereof.

According to a further aspect of the present disclosure, there is provided a program for causing a computer to implement functions including an action plan candidate generating process configured to generate multiple candidates of an action plan constituting multiple action plan candidates on a basis of status of surroundings, an action plan candidate evaluating process configured to assign an evaluation value to each of the generated multiple action plan candidates, and an action plan determining process configured to determine the action plan using the multiple action plan candidates on a basis of the multiple action plan candidates and the evaluation values thereof.

According to an even further aspect of the present disclosure, there is provided a mobile object including an action plan candidate generating section configured to generate multiple candidates of an action plan constituting multiple action plan candidates on a basis of status of surroundings, an action plan candidate evaluating section configured to assign an evaluation value to each of the generated multiple action plan candidates, an action plan determining section configured to determine the action plan using the multiple action plan candidates on a basis of the multiple action plan candidates and the evaluation values thereof, and a control section configured to control motions of the mobile object on a basis of the action plan determined by the action plan determining section.

Thus according to the above-mentioned aspects of the present disclosure, multiple candidates of an action plan constituting multiple action plan candidates are generated on the basis of status of surroundings. An evaluation value is assigned to each of the generated multiple action plan candidates. The action plan is then determined using the multiple action plan candidates on the basis of the multiple action plan candidates and the evaluation values thereof.

ADVANTAGEOUS EFFECTS OF INVENTION

According to the above aspects of the present disclosure, it is possible to generate action plans and to perform autonomous actions accordingly, particularly in situations where the own position is unknown.

DESCRIPTION OF EMBODIMENTS

Figure 1:
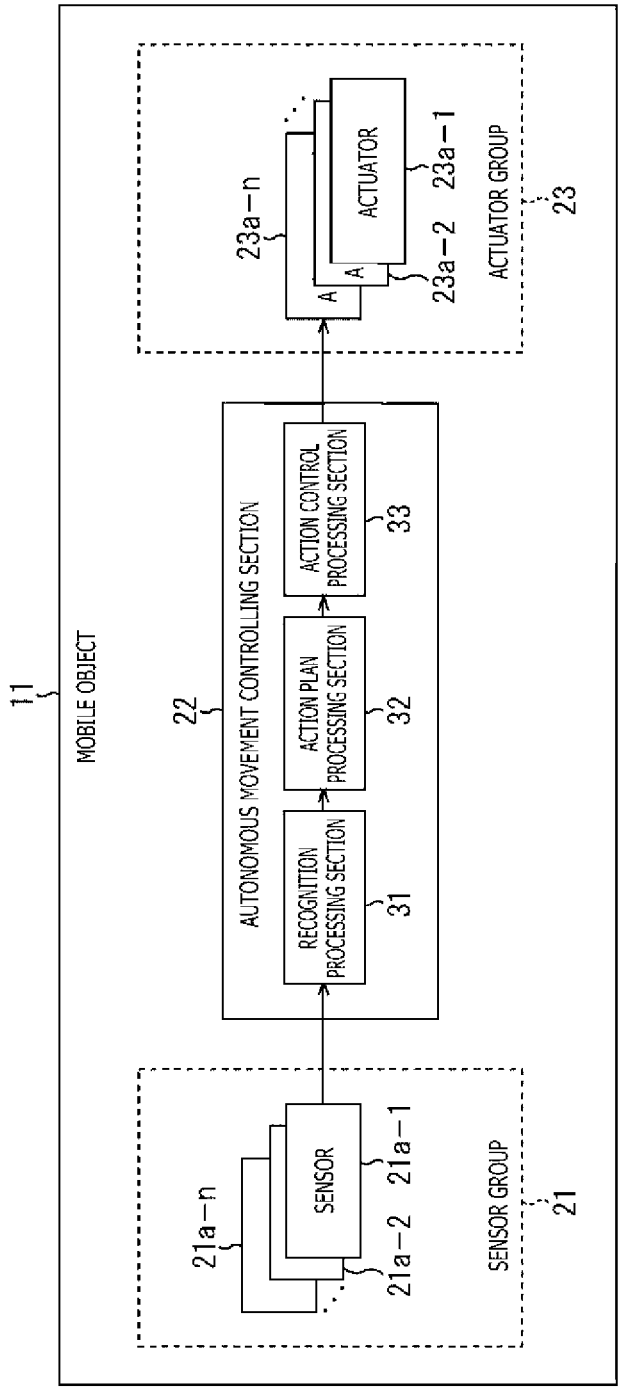
FIG. 1 is a schematic diagram depicting a typical configuration of a mobile object to explain an overview of the present disclosure.

Some preferred embodiments of the present disclosure are described below in detail with reference to the accompanying drawings. Throughout the ensuing description and the accompanying drawings, substantially like or corresponding parts in functional terms will be designated by like reference symbols, and their explanations will be omitted where redundant.

The embodiments implementing the present technology are described below. The description is given under the following headings:

1. Overview of the present disclosure
2. First embodiment
3. Second embodiment
4. Third embodiment
5. Fourth embodiment
6. Examples of execution by software

1. Overview of the Present Disclosure

The mobile object according to the present disclosure moves autonomously by recognizing status of surroundings, generating action plans on the basis of the recognition results, and operating in accordance with the generated action plans.

FIG. 1 depicts a typical configuration of a mobile object 11 giving an overview of the present disclosure.

For example, the mobile object 11 is a robot. The mobile object 11 includes a sensor group 21, an autonomous movement controlling section 22, and an actuator group 23.

The sensor group 21 includes sensors 21a-1 to 21a-n for detecting diverse information needed to recognize the internal workings of the mobile object 11 and status of its surroundings. The sensor group 21 outputs the detection results to the autonomous movement controlling section 22. Incidentally, in cases where there is no particular need to distinguish the individual sensors 21a-1 to 21a-n from each other, the sensors are generically referred to as the sensors 21a hereunder. The same applies to the other configurations as well.

More specifically, the sensors 21a-1 to 21a-n may include, for example, cameras for imaging the surroundings of the mobile object 11; an acceleration sensor for detecting the motions of the mobile object 11; LIDAR ToF (Time of Flight) sensors for measuring the distances to objects in the surroundings of the mobile object 11; a geo-magnetic sensor, a gyro sensor, and an acceleration sensor for detecting the direction of the mobile object 11; an atmospheric pressure sensor for detecting changes in the ambient atmospheric pressure; contact sensors for detecting any contact that may occur; a temperature sensor for detecting temperature; a humidity sensor for detecting humidity; a PSD (Position Sensitive Detector) ranging sensor; and a GNSS (Global Navigation Satellite System) for detecting positions over the earth.

The autonomous movement controlling section 22 recognizes the status of surroundings from the diverse detection results of the sensor group 21, generates action plans on the basis of the recognition results, and operates the actuators 23a-1 to 23a-n of the actuator group 23 in accordance with the action plans to drive the robot. Incidentally, in cases where there is no particular need to distinguish the individual actuators 23a-1 to 23a-n from each other, the actuators are generically referred to as the actuators 23a hereunder. The same applies to the other configurations as well.

More specifically, the autonomous movement controlling section 22 includes a recognition processing section 31, an action plan processing section 32, and an action control processing section 33.

The recognition processing section 31 performs recognition processing on the basis of the detection results supplied from the sensor group 21. For example, the recognition processing section 31 recognizes types, positions, and attributes of images, persons, objects, and facial expressions; positions of obstacles, and the own position. The recognition processing section 31 outputs the recognition results to the action plan processing section 32.

On the basis of the recognition results, the action plan processing section 32 generates action plans covering the overall actions of the mobile object 11, such as the loci of the movements of devices related to the movement of the mobile object 11, state changes of the devices, their velocities, and/or their acceleration. The action plan processing section 32 feeds the action plans thus generated to the action control processing section 33.

On the basis of the action plans supplied from the action plan processing section 32, the action control processing section 33 generates control signals for controlling specific motions of the actuators 23a-1 to 23a-n of the actuator group 23, the control signals thereby causing the actuator group 23 to operate.

On the basis of the control signals supplied from the action control processing section 33, the actuator group 23 operates the actuators 23a-1 to 23a-n specifically to move the mobile object 11. More specifically, the actuators 23a-1 to 23a-n activate motors, servo motors, and brakes, for example, to achieve the specific motions of the mobile object 11 on the basis of the control signals.

Also, the actuators 23a-1 to 23a-n include arrangements for performing expanding and contracting motion, bending and stretching motion, or pivoting motion; a display section configured with an LED (Light Emission Diode) display or an LCD (Liquid Crystal Display) for example; and arrangements such as speakers for outputting sound. Thus when controlled on the basis of the control signals, the actuator group 23 executes the motions of diverse apparatuses to drive the mobile object 11, displays information, and outputs sound.

That is, controlling the actuators 23a-1 to 23a-n of the actuator group 23 controls the motions related to the movement of the mobile object 11, and also controls the presentation of diverse information including information display and sound output.

Overview of the Configuration of the Action Plan Processing Section

Figure 2:
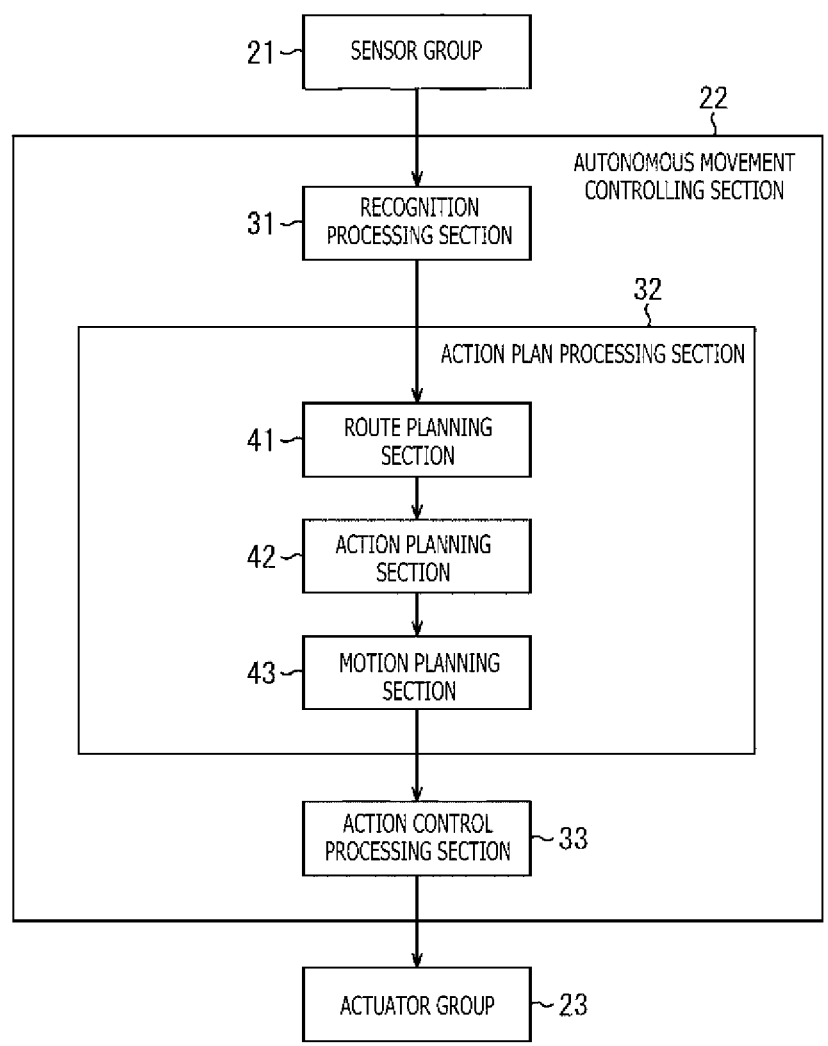
FIG. 2 is an explanatory diagram explaining a typical configuration of an autonomous movement controlling section included in FIG. 1.

An overview of the configuration of the action plan processing section 32 is explained below with reference to FIG. 2.

The action plan processing section 32 includes a route planning section 41, an action planning section 42, and a motion planning section 43.

The route planning section 41 plans the route to the destination on the basis of the recognition results supplied from the recognition processing section 31. When the route is planned, a unique own position may not be obtained from the recognition results. In such cases where the own position is unknown, multiple positions each being potentially the current own position are obtained as own-position candidates. The route planning section 41 plans the route to the destination from each of the multiple candidates as potential current own positions. The ensuing description will proceed on the assumption that the own position is unknown, that multiple own-position candidates are obtained, and that multiple routes are planned with regard to the destination.

Given the multiple routes with regard to the current own position candidates, the action planning section 42 generates candidates of an action plan as action plan candidates, sets an evaluation value to each of the generated multiple action plan candidates, determines the ultimate action plan using the multiple action plan candidates in accordance with their evaluation values, and outputs the ultimately determined action plan to the motion planning section 43.

The motion planning section 43 makes plans, for example, of acceleration, deceleration, and movement loci constituting the motions of the mobile object 11 in order to achieve the action plan devised by the action planning section 42. The motion planning section 43 supplies the data representing the planned motions of the mobile object 11 to the action control processing section 33.

With the processing above carried out where the own position is unknown, multiple routes are planned as needed for each of the potential current own-position candidates on the basis of the recognition results; action plan candidates are generated for each of the generated multiple routes; an evaluation value is set to each of the action plan candidates; and a single action plan is determined using the multiple action plan candidates in accordance with their evaluation values. Consequently, it is possible to determine the action plan even when the own position is unknown. Autonomous action is thus carried out without the own position being known.

2. First Embodiment

Typical configuration of the mobile object controlling system for controlling the mobile object of the present disclosure Explained below is a mobile object controlling system for controlling the mobile object 11 that implements the above-described functions.

Figure 3:
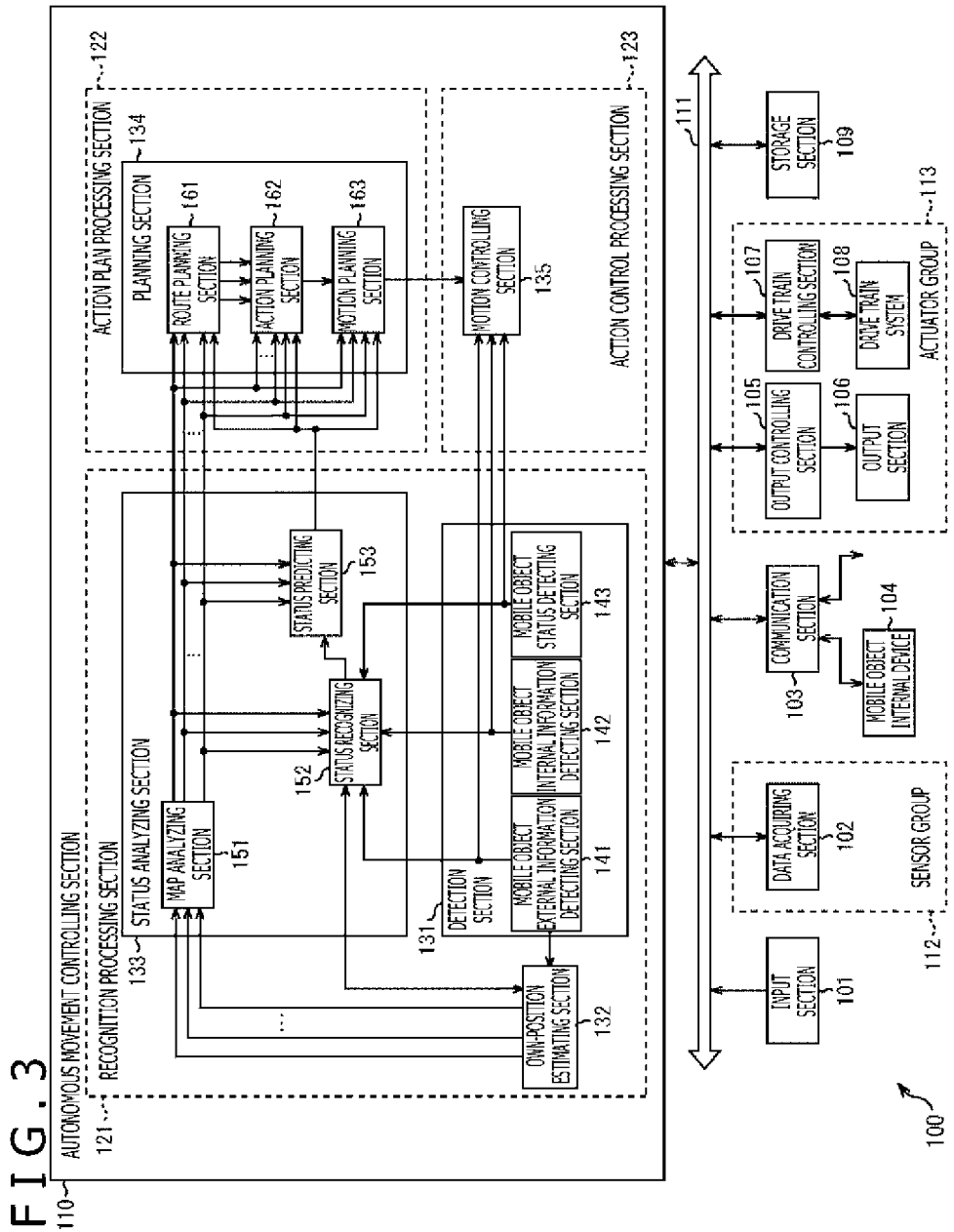
FIG. 3 is a block diagram explaining a typical configuration of a mobile object controlling system for controlling the mobile object according to the present disclosure.

FIG. 3 is a block diagram outlining a typical functional configuration of a mobile object controlling system 100 for controlling the mobile object 11 of the present disclosure. Incidentally, whereas the mobile object controlling system 100 in FIG. 3 is a typical controlling system that controls the mobile object 11 as the robot to which the present technology may be applied, the system may also be used to control other mobile objects such as aircraft, watercraft, and multirotor copters (drones). Also, the robot may be any one of wheel-driven robots, rideable self-driving cars, and multi-legged walking robots.

The mobile object controlling system 100 includes an input section 101, a data acquiring section 102, a communication section 103, a mobile object internal device 104, an output controlling section 105, an output section 106, a drive train controlling section 107, a drive train system 108, a storage section 109, and an autonomous movement controlling section 110. The input section 101, the data acquiring section 102, the communication section 103, the output controlling section 105, the drive train controlling section 107, the storage section 109, and the autonomous movement controlling section 110 are interconnected via a communication network 111. The communication network 111 is, for example, a CAN (Controller Area Network), a LIN (Local Interconnect Network), a LAN (Local Area Network) typically based on IEEE 802.3, a communication network or a bus pursuant to other standards such as FlexRay (registered trademark), or a proprietary communication system that is not standardized. Alternatively, the components of the mobile object controlling system 100 may be directly interconnected without the intervention of the communication network 111.

Incidentally, in cases below where the components of the mobile object controlling system 100 communicate with each other via the communication network 111, the presence of the communication network 111 will not be mentioned further. For example, in the case where the input section 101 and the autonomous movement controlling section 110 communicate with each other via the communication network 111, it is simply stated that the input section 101 and the autonomous movement controlling section 110 communicate with each other.

The input section 101 includes apparatuses used by a passenger to input diverse data and instructions. For example, the input section 101 includes operation devices such as a touch panel, buttons, a microphone, switches, and levers, as well as operation devices permitting non-manual input such as voice input or gesture input. In another example, the input section 101 may be a remote control apparatus that uses infrared rays or other radio waves, or an externally connected device such as a mobile device or a wearable device corresponding to the operation of the mobile object controlling system 100. The input section 101 generates input signals on the basis of the data and instructions input by the passenger, and supplies the generated input signals to the components of the mobile object controlling system 100.

The data acquiring section 102 includes various sensors for acquiring data to be used in processing by the mobile object controlling system 100. The data acquiring section 102 supplies the acquired data to the components of the mobile object controlling system 100.

For example, the data acquiring section 102 includes various sensors constituting a sensor group 112 for detecting the status of the mobile object and other conditions. The sensor group 112 corresponds to the sensor group 21 configured with the sensors 21a-1 to 21a-n in FIG. 1. Specifically, the data acquiring section 102 includes a gyro sensor, an acceleration sensor, an inertial movement unit (IMU), and sensors for detecting the amount of operation for acceleration input, the amount of operation for deceleration input, the amount of operation for direction indicator input; the revolutions, input/output energy level, and fuel consumption of driving apparatuses such as engines or motors; the amounts of torque of engines or motors; or the rotating speeds and torque amounts of wheels and joints, for example.

Also, the data acquiring section 102 may further include various sensors for detecting information regarding the outside of the mobile object, for example. Specifically, the data acquiring section 102 may include imaging apparatus such as a ToF (Time of Flight) camera, a stereo camera, a monocular camera, an infrared camera, a polarization camera, and other cameras, for example. Further, the data acquiring section 102 may include environment sensors for detecting the weather or meteorological conditions, and ambient information detection sensors for detecting objects around the mobile object, for example. The environment sensors include a raindrop sensor, a fog sensor, a sunlight sensor, and a snow sensor, for example. The ambient information detection sensors include a laser ranging sensor, an ultrasonic sensor, radar, a LiDAR (Light Detection and Ranging or Laser Imaging Detection and Ranging) sensor, and a sonar, for example.

Furthermore, the data acquiring section 102 may include various sensors for detecting the current position of the mobile object, for example. Specifically, the data acquiring section 102 includes a GNSS (Global Navigation Satellite System) receiver for receiving GNSS signals from GNSS satellites, for example.

The communication section 103 communicates with the mobile object internal device 104 and with diverse devices, servers, and base stations outside the mobile object, transmits to these devices the data supplied from the components of the mobile object controlling system 100, and supplies the components of the mobile object controlling system 100 with the data received from the communicating devices. Incidentally, the communication protocol supported by the communication section 103 is not limited to any specific protocol. It is also possible for the communication section 103 to support multiple communication protocols.

For example, the communication section 103 communicates with the mobile object internal device 104 using a wireless LAN, Bluetooth (registered trademark), NFC (Near Field Communication), or WUSB (Wireless USB). Also, the communication section 103 communicates with the mobile object internal device 104 through connection terminals, not depicted, (and through a cable if necessary) using a USB (Universal Serial Bus), HDMI (High-Definition Multimedia Interface), or MHL (Mobile High-definition Link), among others.

Furthermore, the communication section 103 communicates, via a base station or an access point, with devices (e.g., application servers or control servers) that exist on an external network (e.g., the Internet, a cloud network, or a business operator's proprietary network), for example. Also, the communication section 103 communicates with terminals located near the mobile object (e.g., terminals carried by pedestrians or installed in shops, or MTC (Machine Type Communication) terminals) using P2P (Peer To Peer) technology, for example. Moreover, in the case where the mobile object 11 is a vehicle, the communication section 103 performs V2X communication such as vehicle-to-vehicle communication, vehicle-to-infrastructure communication, vehicle-to-home communication, and vehicle-to-pedestrian communication, for example. In another example, the communication section 103 is equipped with a beacon receiving section that receives radio waves or electromagnetic waves emitted typically from radio stations set up along the roads, allowing the communication section 103 to acquire such information as the current position, traffic congestion status, traffic regulation, and amounts of time required.

For example, the mobile object internal device 104 includes a mobile device or a wearable device carried by the passenger, an information device brought in or attached to the mobile object, and a navigation system that performs route search for the desired destination.

The output controlling section 105 controls the output of diverse information regarding the passenger of the mobile object or regarding the outside thereof. For example, the output controlling section 105 generates output signals including at least visual information (i.e., image data) or audio information (e.g., audio data), and supplies the generated output signals to the output section 106, thereby controlling how the output section 106 outputs the visual and audio information. Specifically, the output controlling section 105 combines image data captured by different imaging apparatuses of the data acquiring section 102 to generate a bird's-eye view image or a panoramic image, for example, and supplies output signals including the generated image to the output section 106. In another example, the output controlling section 105 generates audio data including a warning sound or a warning message regarding dangers such as collision, contact, or entry into a hazardous zone, and supplies the output section 106 with output signals including the generated audio data.

The output section 106 includes apparatuses capable of outputting the visual or audio information to the passenger of the mobile object or to the outside thereof. For example, the output section 106 includes a display apparatus, an instrument panel, audio speakers, headphones, a wearable device such as a spectacle type display worn by the passenger, projectors, and lamps. Besides being an ordinary display apparatus, the display apparatus included in the output section 106 may be an apparatus that displays visual information in a driver's field of view, such as a head-up display, a transmissive display, or an apparatus with an AR (Augmented Reality) display function, for example. Incidentally, the output controlling section 105 and the output section 106 are not indispensable for the processing of autonomous movement and thus may be omitted if unnecessary.

The drive train controlling section 107 generates various control signals and supplies the generated control signals to the drive train system 108, thereby controlling the drive train system 108. Also, the drive train controlling section 107 supplies the control signals as needed to the components other than the drive train system 108, thereby notifying these components of control status of the drive train system 108, for example.

The drive train system 108 includes various apparatuses related to the drive train of the mobile object. For example, the drive train system 108 includes servo controllers attached to the joints of four legs and allowing their angles and torque amounts to be designated, motion controllers for dissolving the motions of the robot in movement and replacing the dissolved motions with motions of the four legs, and feedback control apparatuses that use motor interior sensors and foot bottom sensors.

In another example, the drive train system 108 includes four to six motors equipped with upward-directed propellers, and motion controllers for dissolving the motions of the robot in movement and replacing the dissolved motions with the amounts of rotation of the motors.

In still another example, the drive train system 108 includes a drive power generating apparatus such as an internal combustion engine or a drive motor for generating drive power, a drive power transmission mechanism for transmitting drive power to the wheels, a steering mechanism for adjusting the rudder angle, a braking apparatus for generating braking force, an ABS (Antilock Brake System), ESC (Electronic Stability Control), and an electric power steering apparatus. Incidentally, the output controlling section 105, the output section 106, the drive train controlling section 107, and the drive train system 108 constitute an actuator group 113 that corresponds to the actuator group 23 including the actuators 23$a$-1 to 23$a$-$n$ in FIG. 1.

The storage section 109 includes a magnetic storage device such as a ROM (Read Only Memory), a RAM (Random Access Memory), or an HDD (Hard Disc Drive); a semiconductor storage device, an optical storage device, and a magneto-optical storage device, for example. The storage section 109 stores various programs and data for use by the components of the mobile object controlling system 100. For example, the storage section 109 stores three-dimensional high-precision maps such as dynamic maps, global maps that are less precise and cover wider areas than the high-precision maps, and local maps including information regarding the surroundings of the mobile object.

The autonomous movement controlling section 110 performs control over autonomous movement such as automated driving or driver assistance. Specifically, the autonomous movement controlling section 110 performs coordinated control for the purpose of implementing the functions of collision avoidance or impact mitigation of the mobile object, tracking movement based on the distance between mobile objects, constant velocity movement of the mobile object, or collision warning for the mobile object, for example. In another example, the autonomous movement controlling section 110 performs coordinated control for the purpose of executing autonomous movement without recourse to operations by an operator or a user. The autonomous movement controlling section 110 includes a detection section 131, an own-position estimating section 132, a status analyzing section 133, a planning section 134, and a motion controlling section 135. Of these components, the detection section 131, the own-position estimating section 132, and the status analyzing section 133 constitute a recognition processing section 121 that corresponds to the recognition processing section 31 in FIG. 1. Also, the planning section 134 constitutes an action plan processing section 122 that corresponds to the action plan processing section 32 in FIG. 1. Furthermore, the motion controlling section 135 constitutes an action control processing section 123 that corresponds to the action control processing section 33 in FIG. 1.

The detection section 131 detects diverse information necessary for autonomous movement control. The detection section 131 includes a mobile object external information detecting section 141, a mobile object internal information detecting section 142, and a mobile object status detecting section 143.

The mobile object external information detecting section 141 performs processes of detecting information external to the mobile object on the basis of data or signals from the components of the mobile object controlling system 100. For example, the mobile object external information detecting section 141 performs the process of detecting, recognizing, and tracking objects around the mobile object and the process of detecting distances to the objects. The objects targeted for detection include mobile objects, people, obstacles, structures, roads, traffic signals, traffic signs, and road markings, for example. As another example, the mobile object external information detecting section 141 performs the process of detecting the surrounding environment of the mobile object. The surrounding environment targeted for detection includes the weather, temperature, humidity, brightness, and road conditions, for example. The mobile object external information detecting section 141 supplies the data representing the results of the detection processing to the own-position estimating section 132, to a map analyzing section 151 and a status recognizing section 152 in the status analyzing section 133, and to the motion controlling section 135, among others.

The mobile object internal information detecting section 142 performs processes of detecting information internal to the mobile object on the basis of the data or signals from the components of the mobile object controlling system 100. For example, the mobile object internal information detecting section 142 performs the process of authenticating and recognizing the driver, the process of detecting the status of the driver, the process of detecting passengers, and the process of detecting the internal environment of the mobile object. The status of the driver targeted for detection includes physical conditions, degree of vigilance, degree of concentration, degree of fatigue, and gaze direction, for example. The mobile object internal environment targeted for detection includes temperature, humidity, brightness, and odor, for example. The mobile object internal information detecting section 142 supplies the data representing the results of the detection processing to the status recognizing section 152 in the status analyzing section 133 and to the motion controlling section 135, among others.

The mobile object status detecting section 143 performs processes of detecting the status of the mobile object on the basis of the data or signals from the components of the mobile object controlling system 100. The mobile object status targeted for detection includes velocity, acceleration, rudder angle, presence of any abnormalities and their details, status of driving operation, position and inclination of the power seat, door lock status, and status of other onboard equipment of the mobile object, for example. The mobile object status detecting section 143 supplies the data representing the results of the detection processing to the status recognizing section 152 in the status analyzing section 133 and to the motion controlling section 135, among others.

The own-position estimating section 132 performs the process of estimating the position and attitude of the mobile object on the basis of the data or signals from the components of the mobile object controlling system 100 such as the mobile object external information detecting section 141 and the status recognizing section 152 in the status analyzing section 133. Also, the own-position estimating section 132 generates, as needed, a local map for use in estimating the own position (called the own-position estimation map hereunder). For example, the own-position estimation map is a high-precision map prepared by use of such techniques as SLAM (Simultaneous Localization and Mapping). The own-position estimating section 132 supplies the data representing the results of the estimation processing to the map analyzing section 151 and the status recognizing section 152 in the status analyzing section 133, among others. Also, the own-position estimating section 132 stores the own-position estimation maps into the storage section 109. Incidentally, the own positions estimated here include those estimated while the own position remains unknown. With the exact own position yet to be known, the estimated own positions also include multiple positions estimated as candidates of the own position. Thus the own-position estimating section 132 generates a local map, as needed, for each of the multiple own positions estimated as the own-position candidates. Also, FIG. 3 depicts multiple arrows starting from the own-position estimating section 132. These arrows indicate that multiple own-position candidates are to be output.

The status analyzing section 133 performs the process of analyzing the status of the mobile object and its surroundings. The status analyzing section 133 includes the map analyzing section 151, the status recognizing section 152, and a status predicting section 153.

The map analyzing section 151 performs the process of analyzing various maps stored in the storage section 109 using, as needed, data or signals from the components of the mobile object controlling system 100 such as the own-position estimating section 132 and the mobile object external information detecting section 141. In so doing, the map analyzing section 151 devises maps that include information necessary for autonomous movement processing. The map analyzing section 151 supplies the devised maps to the status recognizing section 152, to the status predicting section 153; and to a route planning section 161, an action planning section 162, and a motion planning section 163 in the planning section 134, among others. In the case where multiple own positions are estimated as own-position candidates, the map analyzing section 151 devises for each of the candidates a map including information necessary for autonomous movement processing.

The status recognizing section 152 performs the process of recognizing the status regarding the mobile object on the basis of the data or signals from the component of the mobile object controlling system 100 such as the own-position estimating section 132, the mobile object external information detecting section 141, the mobile object internal information detecting section 142, the mobile object status detecting section 143, and the map analyzing section 151. For example, the status recognizing section 152 performs the process of recognizing the status of the mobile object, status of the surroundings of the mobile object, and status of the driver of the mobile object. Also, the status recognizing section 152 generates, as needed, a local map for use in recognizing the status of the surroundings of the mobile object (the map is called the status recognition map hereunder). The status recognition map may be an occupancy grid map, a lane map, or a point cloud map, for example. In the case where multiple own positions area estimated as own-position candidates, the status recognizing section 152 performs the process of recognizing the status of the mobile object for each of the own-position candidates.

The mobile object status targeted for recognition includes the position, attitude, and motions (e.g., velocity, acceleration, and moving direction) of the mobile object, as well as the presence of any abnormalities and their details regarding the mobile object, for example. The status of the mobile object surroundings targeted for recognition includes types and positions of motionless objects in the surroundings; types, positions, and motions (e.g., velocity, acceleration, and moving direction) of moving objects in the surroundings; road configurations in the surroundings; road surface status; and the weather, temperature, humidity, and brightness of the surroundings, for example. The status of the driver targeted for recognition includes physical conditions, degree of vigilance, degree of concentration, degree of fatigue, gaze direction, and driving operation, for example.

The status recognizing section 152 supplies the data representing the results of the recognition processing (including the status recognition map as needed) to the own-position estimating section 132 and the status predicting section 153, among others. Also, the status recognizing section 152 stores the status recognition maps into the storage section 109.

The status predicting section 153 performs the process of predicting the status regarding the mobile object on the basis of the data or signals from the components of the mobile object controlling system 100 such as the map analyzing section 151 and the status recognizing section 152. For example, the status predicting section 153 performs the process of predicting the status of the mobile object, the status of the mobile object surroundings, and the status of the driver. In the case where multiple own positions are estimated as own-position candidates, the status predicting section 153 performs the process of predicting the status regarding the mobile object for each of the own-position candidates.

The mobile object status targeted for prediction includes the behavior of the mobile object, occurrence of any abnormalities in the mobile object, and movable distances of the mobile object, for example. The status of the mobile object surroundings targeted for prediction includes the behavior of moving objects around the mobile object, changes in traffic signals, and environmental changes such as the weather, for example. The status of the driver targeted for prediction includes the behavior of the driver and physical conditions of the driver, for example.

The status predicting section 153 supplies the data representing the results of the prediction processing, along with the data from the status recognizing section 152, to the route planning section 161, the action planning section 162, and the motion planning section 163 in the planning section 134, among others.

The route planning section 161 plans the route to the destination on the basis of the data or signals from the components of the mobile object controlling system 100 such as the map analyzing section 151 and the status predicting section 153. For example, the route planning section 161 sets the route from the current position to the designated destination on the basis of the global map. Also, the route planning section 161 changes the route as needed depending on traffic congestion, traffic accidents, traffic regulation, road repairing, and the driver's physical conditions, for example. The route planning section 161 supplies the data representing the planned route to the action planning section 162, for example. In the case where multiple own positions are estimated, the route planning section 161 plans the route to the destination from each of the multiple own positions.

On the basis of the data or signals from the components of the mobile object controlling system 100 such as the map analyzing section 151 and the status predicting section 153, the action planning section 162 plans actions by which the mobile object moves safety along the route planned by the route planning section 161 within a planned time period. For example, the action planning section 162 plans starts, stops, moving directions (e.g., moving forward, moving backward, turning left, turning right, and turnaround), moving velocity, and passing. The action planning section 162 supplies the data representing the planned actions of the mobile object to the motion planning section 163, among others. In the case where multiple own positions are estimated, the action planning section 162 devises action plans as action plan candidates corresponding to the individual estimated own positions, sets an evaluation value for each of the action plan candidates, and determines the action plan using the multiple action candidates on the basis of their evaluation values.

On the basis of the data or signals from the components of the mobile object controlling system 100 such as the map analyzing section 151 and the status predicting section 153, the motion planning section 163 plans motions in which the mobile object achieves the actions planned by the action planning section 162. For example, the motion planning section 163 plans acceleration, deceleration, and movement locus. The motion planning section 163 supplies the data representing the planned motions of the mobile object to the motion controlling section 135, among others.

The motion controlling section 135 controls the motions of the mobile object.

More specifically, the motion controlling section 135 performs the process of detecting emergencies such as collision, contact, entry into a hazardous zone, abnormalities of the driver, or abnormalities of the mobile object on the basis of the detection results from the mobile object external information detecting section 141, the mobile object internal information detecting section 142, and the mobile object status detecting section 143. In the case where the occurrence of an emergency such as a sudden stop or a sharp turn is detected, the motion controlling section 135 plans motions in which the mobile object averts the emergency.

Also, the motion controlling section 135 controls acceleration and deceleration to achieve the motions of the mobile object planned by the motion planning section 163. For example, the motion controlling section 135 calculates control target values with which the drive power generating apparatus or the braking apparatus achieves the planned acceleration, deceleration, or sudden stop. The motion controlling section 135 supplies control commands representing the calculated control target values to the drive train controlling section 107.

The motion controlling section 135 controls the direction for achieving the motions of the mobile object planned by the motion planning section 163. For example, the motion controlling section 135 calculates control target values with which the steering mechanism achieves the movement locus or sharp turn planned by the motion planning section 163. The motion controlling section 135 supplies control commands representing the calculated control target values to the drive train controlling section 107.

Typical Configuration of the Action Plan Processing Section

Figure 4:
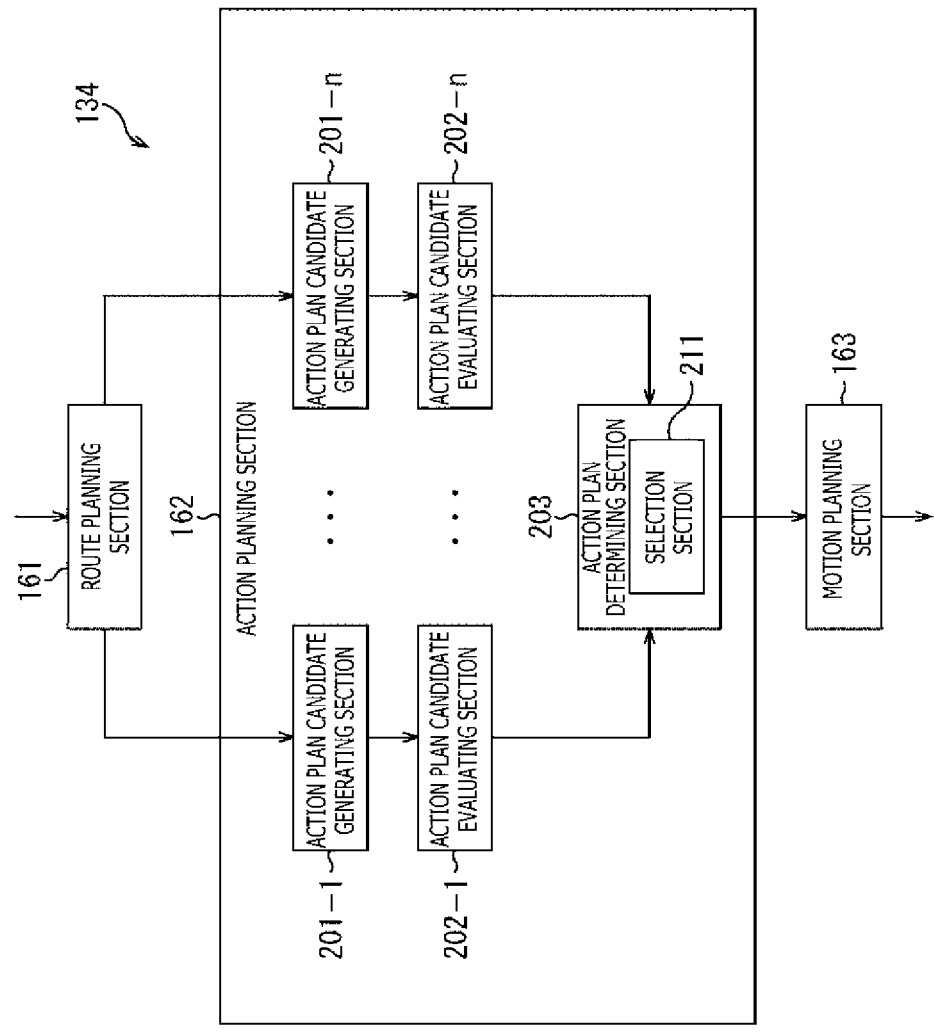
FIG. 4 is a detailed block diagram depicting a typical configuration of a planning section in a first embodiment of the present disclosure.

Explained next with reference to FIG. 4 is one specific configuration of the planning section 134 implementing the action plan processing section 122 which is part of the mobile object controlling system 100 in FIG. 3 and which corresponds to the action plan processing section 32.

In cases where the own position is unknown, it may not be possible to uniquely identify the own position using only the recognition results of the surroundings. In such cases, multiple potential own-position candidates may be identified from the recognition results.

For example, in the case of the mobile object moving inside a building, it may not be possible to identify the currently traveling floor from only the images captured of the surroundings. That is because the structure of one floor often resembles that of another floor. In such a case, all potential candidate floors need to be considered as own-position candidates.

The route planning section 161 then plans the route to the destination from each of the own-position candidates. The route planning section 161 supplies the data representing the planned routes to the action planning section 162.

The action planning section 162 includes multiple action plan candidate generating sections 201-1 to 201-n and multiple action plan candidate evaluating sections 202-1 to 202-n. In cases below where there is no particular need to distinguish the action plan candidate generating sections 201-1 to 201-n from each other, they may be simply referred to as the action plan candidate generating section 201. Likewise, in cases below where there is no particular need to distinguish the action plan candidate evaluating sections 202-1 to 202-n from each other, they may be simply referred to as the action plan candidate evaluating section 202. The same applies to the other structures as well.

The action plan candidate generating sections 201-1 to 201-n generate candidates of the action plan by which the mobile object moves safety within a planned time period along each of the multiple routes planned by the route planning section 161. More specifically, the action plan candidate generating section 201 generates the action plan candidates using, for example, A*algorithm (A star search algorithm) that involves dividing the environment into grids and thereby optimizing arrival determination and path weighting to generate an optimal path, lane algorithm that involves setting paths along the center line of roads, and RRT (Rapidly-exploring Random Tree) algorithm that involves extending and suitably pruning branching paths to a location incrementally reachable from the own position. Incidentally, FIG. 4 depicts two arrows emanating from the route planning section 161 indicating that route data is supplied to the action plan candidate generating sections 201-1 and 201-n. However, in the case where as many as n routes are planned in practice, the data representing the n routes are supplied to the action plan candidate generating sections 201-1 to 201-n, respectively.

The action plan candidate evaluating sections 202-1 to 202-n set evaluation values with respect to the action plan candidates generated by the action plan candidate generating sections 201-1 to 201-n respectively, and output the evaluation values to an action plan determining section 203.

More specifically, the action plan candidate evaluating section 202 sets an evaluation value in accordance with the degree of probability of the own position estimated as an own-position candidate by the own-position estimating section 132, the degree of probability having been used by the action plan candidate generating section 201 to generate an action plan candidate, for example. Here, the degree of probability of the own position is represented by the number of satellites used to identify the own position with GNSS, or the number of objects matched using images of the surroundings, for example. In this example, the larger the number of satellites used or the larger the number of matched objects, the higher the degree of probability. Also, the action plan candidate evaluating section 202 sets the evaluation value on the basis of the recognition results used by the action plan candidate generating section 201 in planning the action plan candidate and in accordance with the degree of matching between prepared map information and the current surrounding environment.

Alternatively, a still larger number of evaluation values to be set may be combined. Also, FIG. 3 depicts an example in which the action plan candidate generating sections 201-1 to 201-n and the action plan candidate evaluating sections 202-1 to 202-n are provided to deal with as many as n action plan candidates, respectively. Alternatively, one action plan candidate generating section 201 and one action plan candidate evaluating section 202 may be provided to deal with n action plan candidates through n process iterations, for example.

The action plan determining section 203 determines the action plan using multiple action plan candidates supplied from the action plan candidate generating sections 201-1 to 201-n on the basis of the evaluation values of these action plan candidates. More specifically, the action plan determining section 203 includes a selection section 211 that selects as the action plan the action plan candidate having the highest or the lowest evaluation value from among the multiple action plan candidates.

Autonomous Movement Controlling Process

Figure 5:
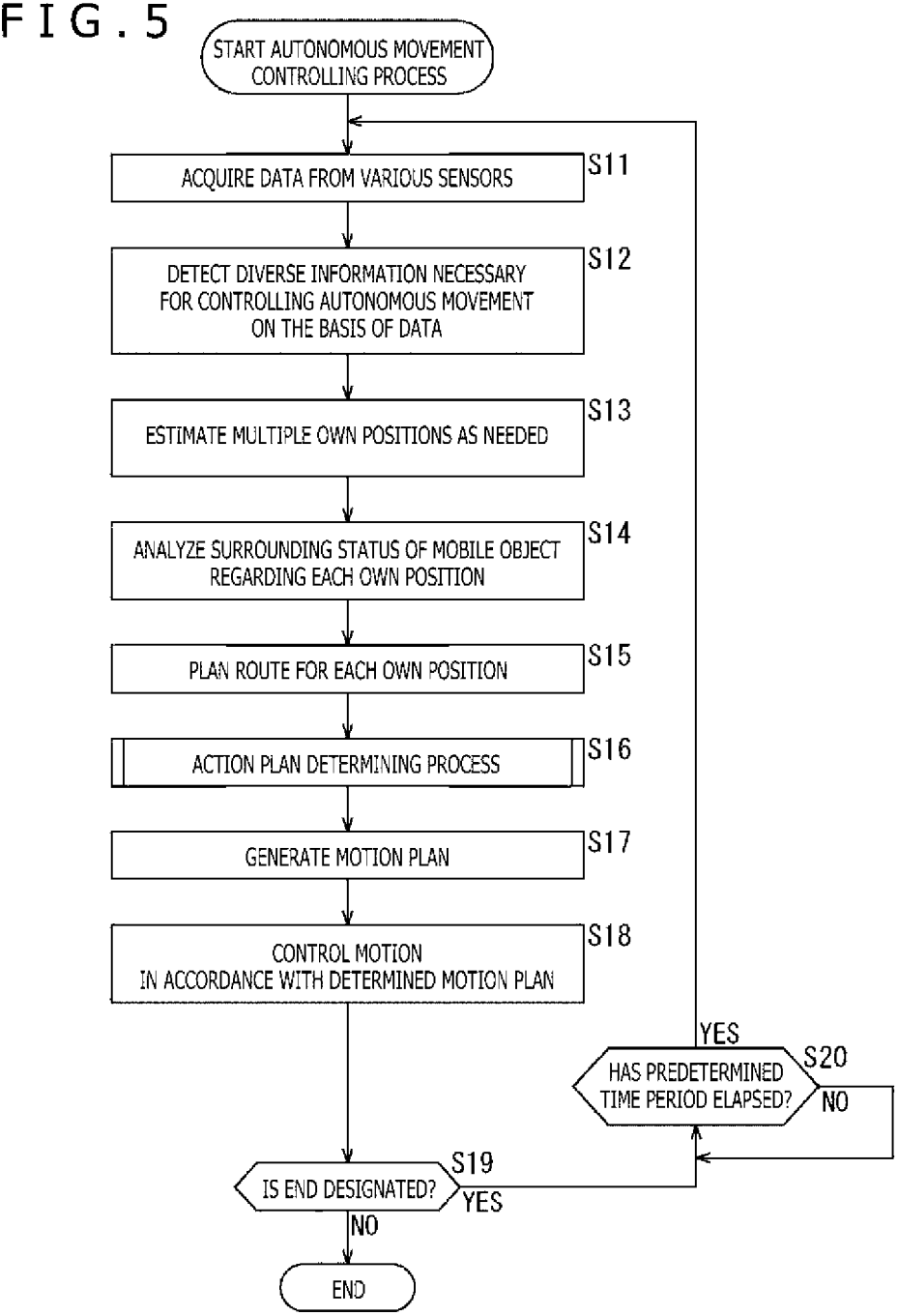
FIG. 5 is a flowchart explaining an autonomous movement controlling process performed by an autonomous movement controlling section included in FIG. 3.

An autonomous movement controlling process performed by the autonomous movement controlling section 110 in FIG. 3 is explained below with reference to the flowchart of FIG. 5.

In step S11, the data acquiring section 102 acquires the data representing the detection results from the various sensors detecting the status of the mobile object and other conditions. The data acquiring section 102 supplies the acquired data to the detection section 131.

In step S12, the detection section 131 detects diverse information necessary for autonomous movement control on the basis of the data acquired by the data acquiring section 102. The detection section 131 outputs the detected information to the own-position estimating section 132, the status analyzing section 133, and the motion controlling section 135.

In step S13, the own-position estimating section 132 estimates the own position on the basis of the detection results, and outputs the results of the estimation to the status analyzing section 133. At this point, in the case where the unique own position is not estimated from the detection results, the own-position estimating section 132 estimates multiple own-position candidates each considered to be a potential own position. The own-position estimating section 132 outputs the estimation results to the status analyzing section 133. The estimation results include information regarding the degrees of probability of the own-position candidates.

More specifically, the own-position estimating section 132 stores as a preliminary knowledge the feature points of objects located in a space into which the mobile object may move shortly, the feature points being associated with the positions of the objects when stored beforehand. At the time the mobile object moves autonomously, the data acquiring section 102 may use, for example, cameras to capture images of the surroundings, extract feature points from the captured images, and compare the extracted feature points with those of the objects stored as the preliminary knowledge. The own-position estimating section 132 may then estimate the unique own position from information regarding the positions of the objects of which the number of matched feature points exceeds a predetermined value.

Also, in the case where there exist in the surroundings only the objects of which the number of matched feature points is smaller than the predetermined value following the comparison between the feature points extracted from the images of the surroundings and the feature points stored as the preliminary knowledge, the own-position estimating section 132 cannot estimate the unique own position. In that case, the own-position estimating section 132 may estimate the own-position candidates from the positions of the objects of which the number of matched feature points is smaller than the predetermined value. At this time, the number of those feature points of the objects around the position estimated to be an own-position candidate, which match the feature points extracted from the images of the surroundings, may be used as the degree of probability of that estimated own-position candidate, for example.

In step S14, the status analyzing section 133 analyzes the status of the surroundings for each of the own-position candidates. The status analyzing section 133 outputs the analysis results regarding each own-position candidate to the own-position estimating section 132 and the planning section 134.

In step S15, the route planning section 161 in the planning section 134 plans the route to the destination on the basis of the analysis results regarding each of the own-position candidates. The route planning section 161 outputs the planned routes to the action planning section 162.

In step S16, the action planning section 162 performs an action plan determining process. The action planning section 162 generates multiple action plan candidates on the basis of the route planned for each of the multiple own-position candidates, sets an evaluation value to each of the action plan candidates, and determines the action plan on the basis of the evaluation values. The action planning section 162 outputs the action plan to the motion planning section 163. The action plan determining process will be discussed later in detail with reference to FIG. 6.

In step S17, the motion planning section 163 generates a motion plan by which the output controlling section 105 controls the output section 106 in accordance with the action plan supplied from the action planning section 162, the motion plan being further used by the drive train controlling section 107 to control the drive train system 108.

In step S18, the output controlling section 105 controls the output section 106 on the basis of the motion plan supplied from the motion planning section 163. Also, the drive train controlling section 107 controls the drive train system 108 in accordance with the motion plan supplied from the motion planning section 163.

In step S19, the autonomous movement controlling section 110 determines whether or not an end is designated. In the case where the end has yet to be designated, control is transferred to step S20.

In step S20, the autonomous movement controlling section 110 determines whether or not a predetermined time period has elapsed. The autonomous movement controlling section 110 repeats the determining process until the predetermined time period elapses. In the case where the predetermined time period has elapsed in step S20, control is returned to step S11. That is, the process of step S11 to step S20 is repeated at intervals of the predetermined time period.

That is, in the case where multiple candidates of the own position are obtained, i.e., where the own position is unknown, action plan candidates are generated with respect to the multiple own-positions obtained as candidates. An evaluation value is obtained for each of the action plan candidates. The action plan is determined using the obtained multiple action plan candidates on the basis of their evaluation values. Then the movement based on the action plan is repeated.

Consequently, even if the own position is unknown, the above-described movement is repeated so that the information regarding the surroundings may be gradually collected. This improves the accuracy of detecting the own position. Eventually, it is possible to generate the action plan in accordance with the information regarding a uniquely identified own position. This makes it possible to accomplish the autonomous movement of the mobile object.

Action Plan Determining Process Using the Planning Section in FIG. 4

Figure 6:
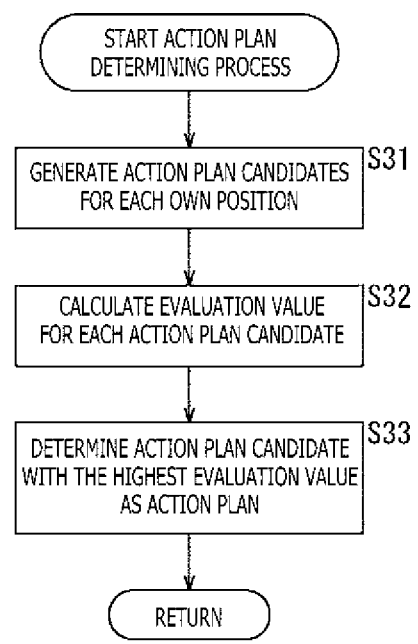
FIG. 6 is a flowchart explaining an action plan determining process involving the use of the planning section depicted in FIG. 4.

The action plan determining process performed by the planning section 134 in FIG. 4 is explained below with reference to the flowchart of FIG. 6.

In step S31, each of the action plan candidate generating sections 201-1 to 201-$n$ generates an action plan candidate on the basis of the route planned for each of the own-position candidates. The action plan candidate generating sections 201-1 to 201-$n$ output the generated action plan candidates to the action plan candidate evaluating sections 202-1 to 202-$n$ respectively.

For example, in the case where a first route is planned on the basis of a first own position (X=3, Y=2, degree of probability=80) and a second route is planned on the basis of a second own position (X=105, Y=100, degree of probability=20), the action plan candidates are generated as described below. Incidentally, the coordinates X and Y of the own position represent those on a map, and the degree of probability stands for that of the own position on a scale of 0 to 100.

That is, on the basis of the first route planned in accordance with the first own position (X=3, Y=2, degree of probability=80), the action plan candidate generating section 201-1 calculates as a first action plan candidate a first target velocity vector that corresponds to the path connecting the current position with the next point, for example.

Also, on the basis of the second route planned in accordance with a first own position (X=105, Y=100, degree of probability=20), the action plan candidate generating section 201-2 calculates as a first action plan candidate a second target velocity vector that corresponds to the path connecting the current position with the next point, for example.

In step S32, the action plan candidate evaluating sections 202-1 to 202-$n$ calculate and set evaluation values for the respective action plan candidates.

More specifically, the action plan candidate evaluating section 202-1 sets, as the evaluation value of the first action plan candidate, the degree of probability of 80 to the first own position (X=3, Y=2, degree of probability=80) used to plan the first route for use in generating the first action plan candidate constituted by the first target velocity vector, for example. Also, the action plan candidate evaluating section 202-2 sets, as the evaluation value, the degree of probability of 20 to the second own position (X=105, Y=100, degree of probability=20) used to plan the second route for use in generating the second action plan candidate constituted by the second target velocity vector, for example.

In step S33, the action plan determining section 203 controls the selection section 211 to determine as the action plan the action plan candidate that has the highest of the evaluation values set to the action plan candidates. That is, in the present case, the first target velocity vector that is the action plan candidate based on the first own position has the evaluation value of 80, which is higher than the evaluation value of 20 set to the second target velocity vector that is the action plan candidate based on the second own position. In view of the highest evaluation value, the action plan determining section 203 determines the first action plan candidate constituted by the first target velocity vector as the action plan.

Incidentally, in the present case, each evaluation value is set in accordance with the degree of probability of the own position, so that the action plan candidate with the highest evaluation value is selected. However, in the case where the evaluation value is set using an inverse number of the degree of probability, the action plan candidate with the lowest evaluation value is determined to be the action plan. As another alternative, the evaluation value may be settings other than the degree of probability of the own position.

With the processing above carried out in the situation where the own position is unknown and not uniquely identified, a route is planned from each of the multiple own-position candidates, an action plan candidate is generated for each of the planned routes, an evaluation value is set to each of the generated action plan candidates, and the action plan candidate with the highest (or the lowest) evaluation value is set as the action plan. With the action plan candidate having the highest (or the lowest) evaluation value thus selected, the action plan is suitably generated.

In the example explained above, two own-position candidates are obtained, the route from each of the own-position candidates to the destination is planned, an action plan candidate is acquired for each of the planned routes, and the action plan candidate having the highest evaluation value is determined to be the action plan. Alternatively, there may be more than two own-position candidates and more than two action plan candidates corresponding thereto. Also in this case, the action plan is determined when the action plan candidate with the highest (or the lowest) evaluation value is selected.

Furthermore, when the own position is repeatedly detected at intervals of a predetermined time period, the action plan candidate is repeatedly evaluated, and the action plan is repeatedly generated, the action plan candidates come to be acquired each with a gradually increasing amount of data. The accuracy of detecting the own position is thus increased correspondingly. That is, with the accuracy of detecting the own position increased progressively, the own position gradually comes to be obtained uniquely. Eventually, the action plan also comes to be acquired uniquely.

3. Second Embodiment

In the above-described example in which the own position is unknown and multiple own-position candidates are detected, a route is established for each of the own-position candidates, an action plan candidate is generated for each of the established routes, an evaluation value is set to each of the generated action plan candidates, and the action plan candidate with the highest (or the lowest) evaluation value is set as the action plan. However, in the case where the action plan is selectively determined from multiple action plan candidates that are quite different from one another, an erroneous selection of one such candidate can cause significant damage. In view of this, the action plan may be determined alternatively by merging the multiple action plan candidates on the basis of their evaluation values.

Figure 7:
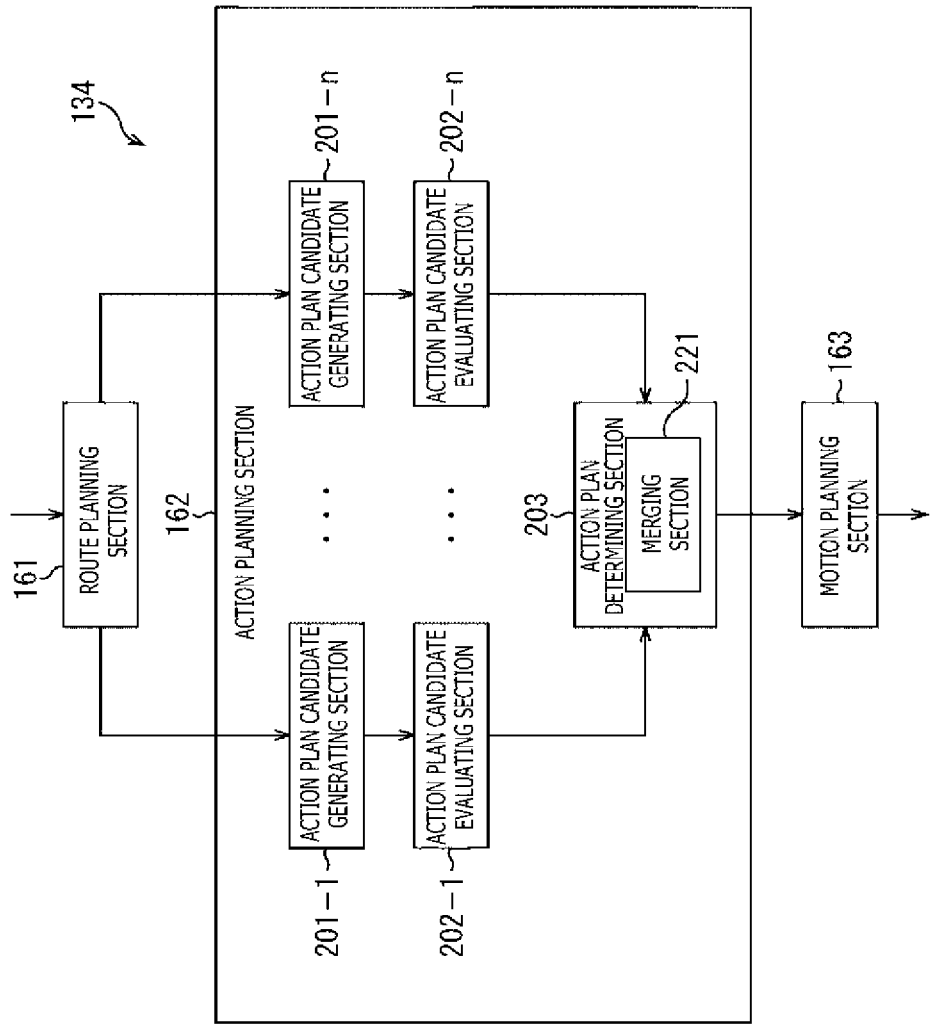
FIG. 7 is a detailed block diagram depicting a typical configuration of the planning section in a second embodiment of the present disclosure.

FIG. 7 depicts a typical configuration of the planning section 134 that determines the action plan by merging multiple action plan candidates on the basis of their evaluation values. Incidentally, of the components of the planning section 134 in FIG. 7, those having the same functions as their counterparts of the planning section 134 in FIG. 4 are designated by the same reference symbols, and their explanations are omitted hereunder where appropriate.

That is, the planning section 134 in FIG. 7 differs from the planning section 134 in FIG. 4 in that a merging section 221 is provided to replace the selection section 211 in the action plan determining section 203.

Figure 8:
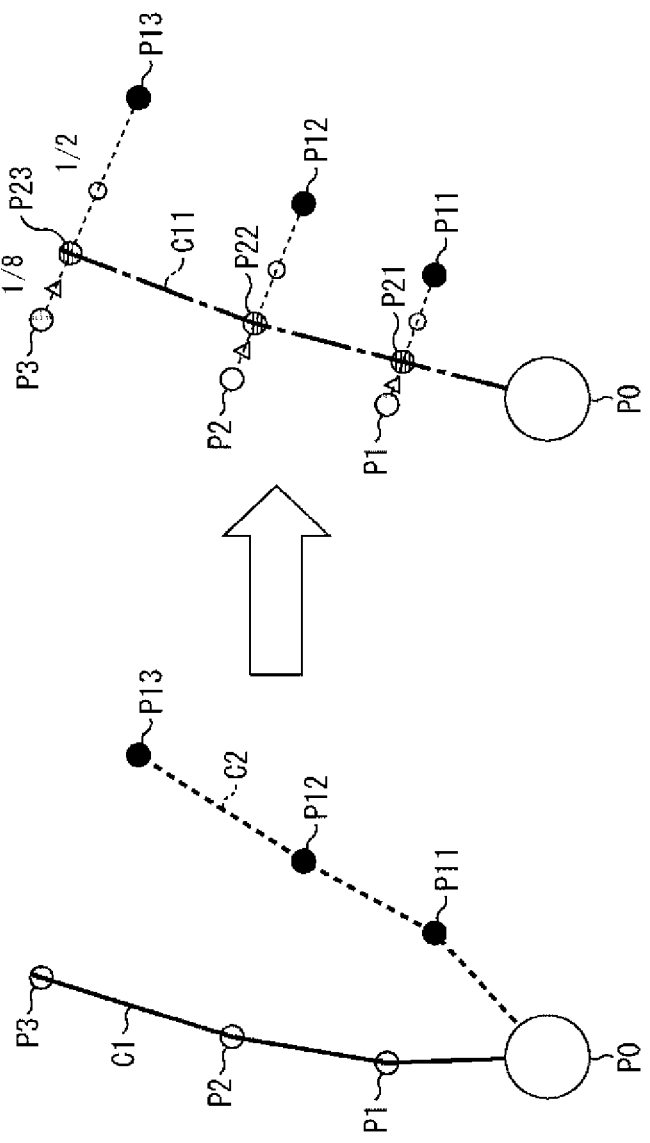
FIG. 8 is an explanatory diagram explaining an action plan determining process involving the use of the planning section depicted in FIG. 7.

For example, consider a case in which, as depicted in the left subfigure in FIG. 8, corresponding to a current position P0, a path C1 moving through passing points P1, P2, and P3 is obtained as a first action candidate, and a path C2 moving through passing points P11, P12, and P13 is acquired as a second action plan candidate.

It is assumed here that the evaluation value for the path C1 as the first action plan candidate is 20 and that the evaluation value for the path C2 as the second action plan candidate is 80. On this assumption, as depicted in the right subfigure in FIG. 8, the merging section 221 sets a new passing point P21 to an intermediate position at a ratio of 20:80 (=1/8:1/2) between the passing points P1 and P11, a new passing point P22 to an intermediate position at a ratio of 20:80 (=1/8:1/2) between the passing points P2 and P12, a new passing point P23 to an intermediate position at a ratio of 20:80 (=1/8:1/2) between the passing points P3 and P13. The merging section 221 then sets a new path C11 constituted by passing points P0, P21, P22, and P23. In this manner, the merging section 221 determines as the action plan the new path C11 that merges the path C1 as the first action plan candidate and the path C2 as the second action plan candidate.

That is, in the example of FIG. 8, the intermediate positions are set between the two action plan candidates in a manner weighted according to the evaluation values of the candidates. With the intermediate positions thus established, a single action plan is determined by merging the two action plan candidates in accordance with their evaluation values.

In this manner, it is possible to implement the action plan reflecting the evaluation values of the multiple action plan candidates.

Action Plan Determining Process Using the Planning Section in FIG. 7

Figure 9:
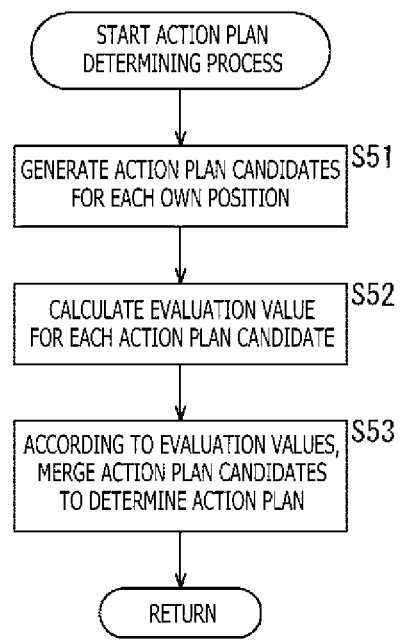
FIG. 9 is a flowchart explaining the action plan determining process involving the use of the planning section depicted in FIG. 7.

The action plan determining process performed by the planning section 134 in FIG. 7 is explained below with reference to the flowchart of FIG. 9.

In step S51, each of the action plan candidate generating sections 201-1 to 201-n generates an action plan candidate on the basis of the route planned for each of the own-position candidates. The action plan candidate generating sections 201-1 to 201-n output the generated action plan candidates to the action plan candidate evaluating sections 202-1 to 202-n respectively.

In step S52, the action plan candidate evaluating sections 202-1 to 202-n calculate and set evaluation values for the respective action plan candidates.

In step S53, the action plan determining section 203 determines the action plan by controlling the merging section 221 to merge the multiple action plan candidates on the basis of their evaluation values as explained above with reference to FIG. 8, for example.

With the processing above carried out in the situation where the own position is unknown and is not uniquely identified, a route is planned from each of multiple own-position candidates, an action plan candidate is generated for each of the planned routes, an evaluation value is set for each of the generated action plan candidates, and the action plan candidates are merged on their basis of their evaluation values to establish the action plan.

In this manner, an action plan candidate with a high evaluation value and an action plan candidate with a low evaluation value are merged in accordance with their evaluation values. This makes it possible suitably to set the action plan with a predetermined degree of probability while reducing risks emanating from erroneously selecting one of the action plan candidates.

In the above-described example, two own-position candidates are obtained, a route from each of the own-position candidates to the destination is planned, an action plan candidate is acquired for each of the planned routes, and the action plan is determined by merging the own-position candidates in accordance with their evaluation values. Alternatively, there may be more than two own-position candidates that, in like manner, may be merged according to their evaluation values. For example, in the case where there are three or more candidates, the coordinate values of the elements making up the candidates may be weighted to provide the position of the center of gravity of each element.

4. Third Embodiment

Explained above was the example in which multiple action plan candidates are merged on the basis of their evaluation values to determine the action plan. However, in the case where action plan candidates are paths that diverge from each other in quite a significant manner, merging these paths can result in a completely different path.

In view of that, in the case where multiple action plan candidates are generated, a degree of divergence between the multiple action plan candidates may be calculated. If the degree of divergence is smaller than a predetermined value, with the multiple action plan candidates similar to one another to a certain degree, the multiple action plan candidates may be merged to determine the action plan. If the degree of divergence is higher than the predetermined value, with the multiple action plan candidates significantly different from one another, one of the candidates may be selected according to their evaluation values to determine the action plan.

In the description that follows, the action plan determining process for determining the action plan by selecting one of multiple action plan candidates in accordance with their evaluation values, as explained above with reference to the flowchart of FIG. 6, will be referred to as the selective action plan determining process. On the other hand, the action plan determining process for determining the action plan by merging multiple action plan candidates on the basis of their evaluation values, as explained above with reference to the flowchart of FIG. 9, will be referred to as the merging action plan determining process.

Figure 10:
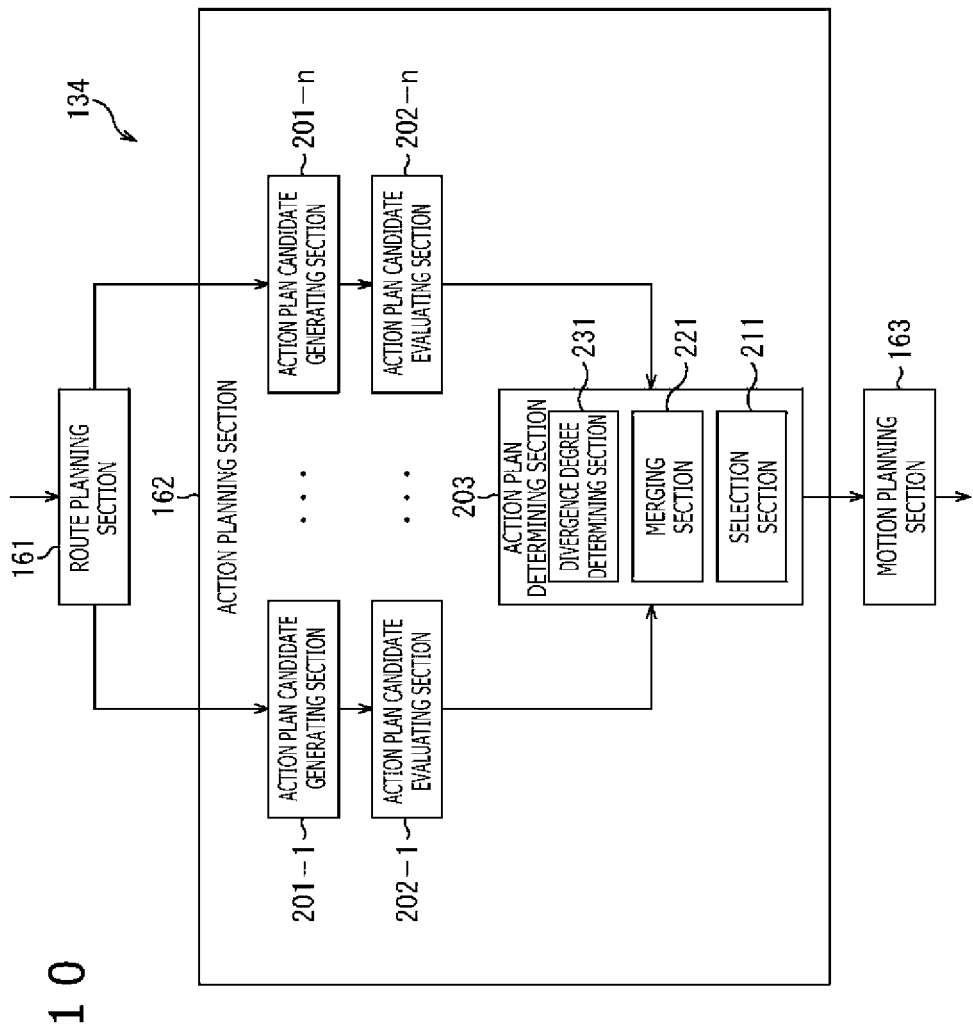
FIG. 10 is a detailed block diagram depicting a typical configuration of the planning section in a third embodiment of the present disclosure.

FIG. 10 depicts a typical configuration of the planning section 134 designed to implement the action plan determining process by selecting either the selective action plan determining process or the merging action plan determining process based on calculations of the degree of divergence between multiple action plan candidates when these multiple action plan candidates are planned. Incidentally, of the components of the planning section 134 in FIG. 10, those having the same functions as their counterparts of the planning section 134 in FIGS. 4 and 7 are designated by the same reference symbols, and their explanations are omitted hereunder where appropriate.

That is, the planning section 134 in FIG. 10 differs from the planning section 134 in FIG. 4 or 7 in that both the selection section 211 and the merging section 221 are provided and that a divergence degree determining section 231 is added.

In the case where multiple action plan candidates are obtained, the divergence degree determining section 231 calculates the degree of divergence therebetween. In the case in which the degree of divergence between the candidates is determined to be larger than a predetermined value, the divergence degree determining section 231 selects the selective action plan determining process. In the case where the degree of divergence is determined to be smaller than the predetermined value, the divergence degree determining section 231 selects the merging action plan determining process.

Figure 11:
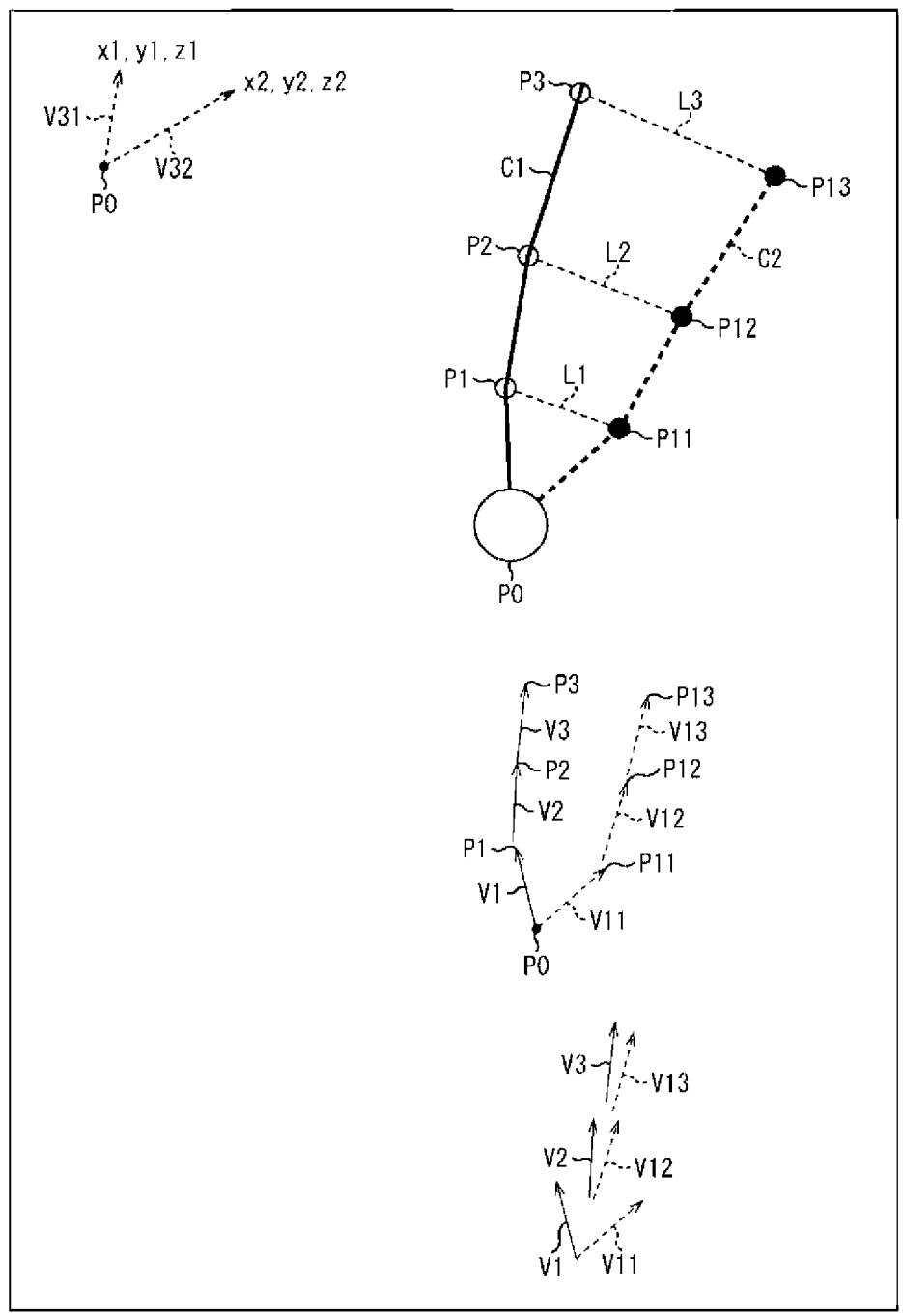
FIG. 11 is an explanatory diagram explaining the action plan determining process involving the use of the planning section depicted in FIG. 10.

More specifically, in the case where multiple action plan candidates are constituted by vectors V31 and V32 depicted in the left subfigure in FIG. 11 for example, the divergence degree determining section 231 may determine the degree of divergence between the candidates using the difference between their weighted vectors.

That is, the difference between the weighted vectors is defined by the following expression (1) when the vectors V31 and V32 are represented by (x1, y1, z1) and (x2, y2, z2), respectively:

$$\text{Est}=a\times(x1-x2)^2+b\times(y1-y2)^2+c\times(z1-z2)^2 \qquad (1)$$

In the above expression, Est stands for the degree of divergence. Characters a, b, and c denote the weights in the x-, y-, and z-axis directions, respectively, where a=b=c=1, for example.

Also, in the case where the degree of divergence Est is set by the above expression (1), there is a possibility that the degree of divergence may be large in the same direction over different lengths. By contrast, in the case where each vector is normalized in the same direction as indicated by the following expression (2), the degree of divergence may be made smaller:

$$\text{Est}=a\times(x1/L1-x2/L2)^2+b\times(y1/L1-y2/L2)^2+c\times(z1/L1-z2/L2)^2 \qquad (2)$$

In the above expression, L1 stands for $\sqrt{(x1^2+y1^2+z1^2)}$ and L2 for $\sqrt{(x2^2+y2^2+z2^2)}$.

Furthermore, in the case where one action plan candidate is represented by a path C1 including passing points P1, P2, and P3, and another action plan by a path C2 including passing points P11, P12, and P13 as indicated in the top right of FIG. 11, as indicated by the following expression (3), the degree of divergence Est may be the sum of a difference L11 between the passing points P1 and P2 (=P1−P11), a difference L12 between the passing points P2 and P12 (=P2−P12), and a difference L13 between the passing points P3 and P13 (=P3−P13).

$$\text{Est}=L11+L12+L13 \qquad (3)$$

Also, as indicated in the middle right of FIG. 11, an intermediate point between the passing points on each of the paths C1 and C2 may be represented by a vector. As depicted in the bottom right of FIG. 11, the degrees of divergence between the vectors may then be added up.

That is, on the path C1 depicted in the middle right of FIG. 11, a vector V1 is defined by passing points P0 to P1, a vector V2 by passing points P1 to P2, and a vector V3 by passing points P2 to P3. Also, on the path C2, a vector V11 is defined by passing points P0 to P11, a vector V12 by passing points P11 to p12, and a vector V13 by passing points P12 to P13.

As indicated in the bottom right of FIG. 11, the divergence degree determining section 231 may obtain a degree of divergence Est1 between the vectors V1 and V11, a degree of divergence Est2 between the vectors V2 and V12, and a degree of divergence Est3 between the vectors V3 and V13. The divergence degree determining section 231 may then add up these degrees of divergence to acquire the degree of divergence Est for determination by comparison with a predetermined value, as indicated by the following expression (4):

$$\text{Est}=\text{Est}1+\text{Est}2+\text{Est}3 \qquad (4)$$

On the basis of the degree of divergence between the action plan candidates defined as described above, it is determined whether the selective action plan determining process is adopted or the merging action plan determining process is adopted using the multiple action plan candidates.

Action Plan Determining Process Using the Planning Section in FIG. 10

Figure 12:
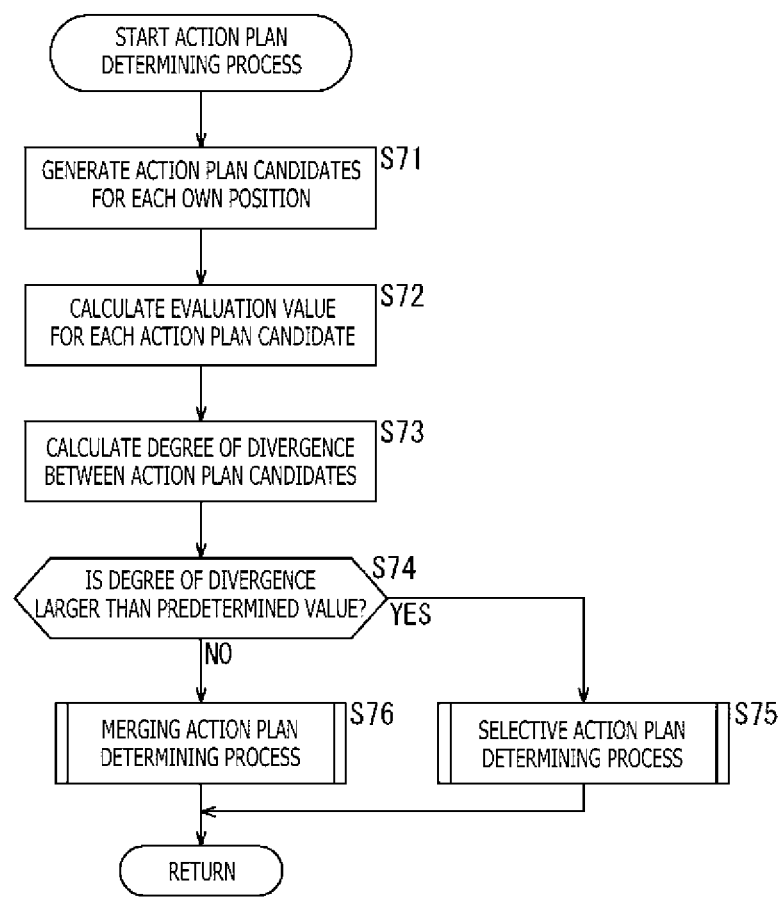
FIG. 12 is a flowchart explaining the action plan determining process involving the use of the planning section depicted in FIG. 10.

The action plan determining process performed by the planning section 134 in FIG. 10 is explained below with reference to the flowchart of FIG. 12.

In step S71, each of the action plan candidate generating sections 201-1 to 201-n plans an action plan candidate on the basis of the route planned for each of the own-position candidates. The action plan candidate generating sections 201-1 to 201n output the planned action plan candidates to the action plan candidate evaluating sections 202-1 to 202-n respectively.

In step S72, the action plan candidate evaluating sections 202-1 to 202-n set evaluation values for the respective action plan candidates, and output the evaluation values to the action plan determining section 203.

In step S73, the action plan determining section 203 controls the divergence degree determining section 231 to calculate the degree of divergence between multiple action plan candidates. For example, the divergence degree determining section 231 calculates the degree of divergence using the technique explained above with reference to FIG. 11, for example.

In step S74, the divergence degree determining section 231 determines whether or not the degree of divergence is higher than a predetermined value, with a significant divergence between the action plan candidates. In the case where it is determined in step S74 that the degree of divergence is higher than the predetermined value given a significant divergence between the action plan candidates, control is transferred to step S75.

In step S75, given that there is a significant divergence between the multiple action plan candidates, the action plan determining section 203 performs the selective action plan determining process. On the basis of the evaluation values of the multiple action plan candidates, the action plan determining section 203 selectively determines the action plan candidate with the highest (or the lowest) evaluation value as the action plan.

On the other hand, in the case where it is determined in step S74 that the degree of divergence is lower than the predetermined value given the presence of an insignificant divergence, control is transferred to step S76.

In step S76, given that there is an insignificant divergence between the multiple action plan candidates, the action plan determining section 203 performs the merging action plan determining process. The action plan determining section 203 determines the action plan by merging the multiple action plan candidates on the basis of their evaluation values.

With the processing above carried out where the degree of divergence between multiple action plan candidates is low, there is a high degree of similarity therebetween. In that case, the action plan is determined by merging the multiple action plan candidates in accordance with their evaluation values. This makes it possible to generate a highly accurate action plan based on numerous action plan candidates. Where there is a high degree of divergence between multiple action plan candidates, there exists a low degree of similarity therebetween. In this case, of the multiple action candidates, the candidate with the highest (or the lowest) evaluation value is selectively determined as the action plan. This makes it possible to set a highly probable action plan candidate as the action plan.

5. Fourth Embodiment

Explained above was the example in which, when multiple action plan candidates are planned, either the selective action plan determining process or the merging action plan determining process is performed in accordance with the degree of divergence between the candidates. However, in an example in which the number of own-position candidates is increased, other action plan candidate generating sections 201 are activated anew to generate more action plan candidates. At this time, the existing action plan candidate generating sections 201-x having generated the action plan candidates so far coexist with the additional action plan candidate generating sections 201-y starting to generate more action plan candidates anew.

Incidentally, as depicted in FIG. 3, given the feedback of the status analysis results from the status analyzing section 133, the own-position estimating section 132 improves the accuracy of estimated own positions over time. It follows that there is a difference in accuracy between the action plan candidates generated corresponding to the own positions estimated so far as own-position candidates on the one hand, and the action plan candidates based on information regarding the own positions newly estimated as own-position candidates on the other hand. Obviously, the accuracy of the action plan candidates generated anew on the basis of the newly estimated own-position candidates is lower than the accuracy of the action plan candidates generated corresponding to the own-position candidates estimated so far.

In view of this, an action plan candidate obtained corresponding to the own position newly estimated as an own-position candidate may be considered invalid until the feedback is repeated for a predetermined time period. Upon elapse of the predetermined time period, the action plan candidate may be used as a valid action plan candidate.

Figure 13:
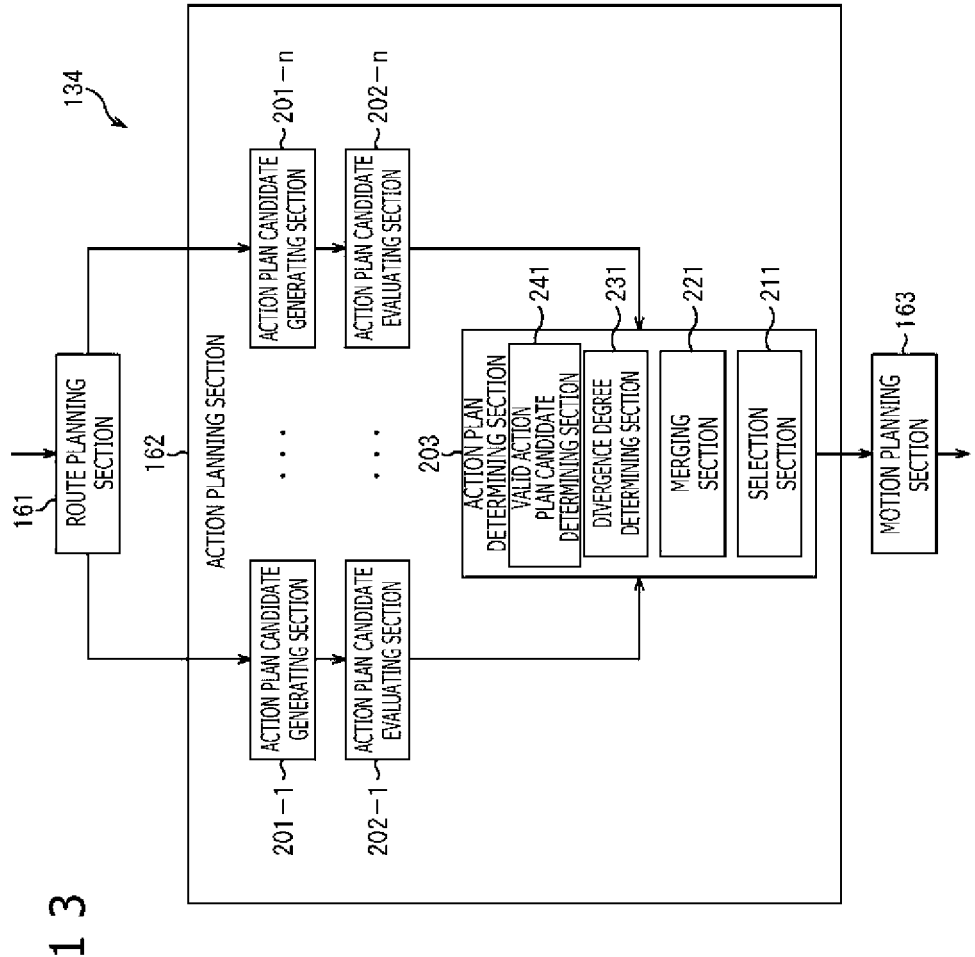
FIG. 13 is a detailed block diagram depicting a typical configuration of the planning section in the third embodiment of the present disclosure.

FIG. 13 depicts a typical configuration of the planning section 134 that considers invalid a newly planned action plan candidate corresponding to a newly estimated own-position candidate for a predetermined time period, the planning section 134 using the newly planned action plan candidate as a valid action plan candidate upon elapse of the predetermined time period. Incidentally, of the components of the planning section 134 in FIG. 13, those having the same functions as their counterparts of the planning section 134 in FIG. 10 are designated by the same reference symbols, and their explanations are omitted hereunder where appropriate.

That is, the planning section 134 in FIG. 13 differs from the planning section 134 in FIG. 10 in that a valid action plan candidate determining section 241 is provided anew.

Of the action plan candidates generated by the action plan candidate generating section 201 and assigned their evaluation values by the action plan candidate evaluating section 202, those candidates for which a predetermined time period has yet to elapse since their generation are set as invalid action plan candidates by the valid action plan candidate determining section 241. The valid action plan candidate determining section 241 sets the action plan candidates for which the predetermined time period has elapsed as the valid action plan candidates.

The divergence degree determining section 231 calculates the degree of divergence using only the valid action plan candidates. In accordance with the calculated degree of divergence, the divergence degree determining section 231 determines whether the selection section 211 is to perform the selective action plan determining process to determine the action plan by selecting the action plan candidate with the highest evaluation value from the valid action plan candidates, or the merging section 221 is to carry out the merging action plan determining process to determine the action plan by merging the valid action plan candidates in accordance with their evaluation values.

It is assumed here that the action plan candidate generating section 201-1 plans an action plan candidate CP1 on the basis of a first route set corresponding to a first own-position candidate and that the action plan candidate generating section 201-2 plans an action plan candidate CP2 on the basis of a second route set corresponding to a second own-position candidate.

Figure 14:
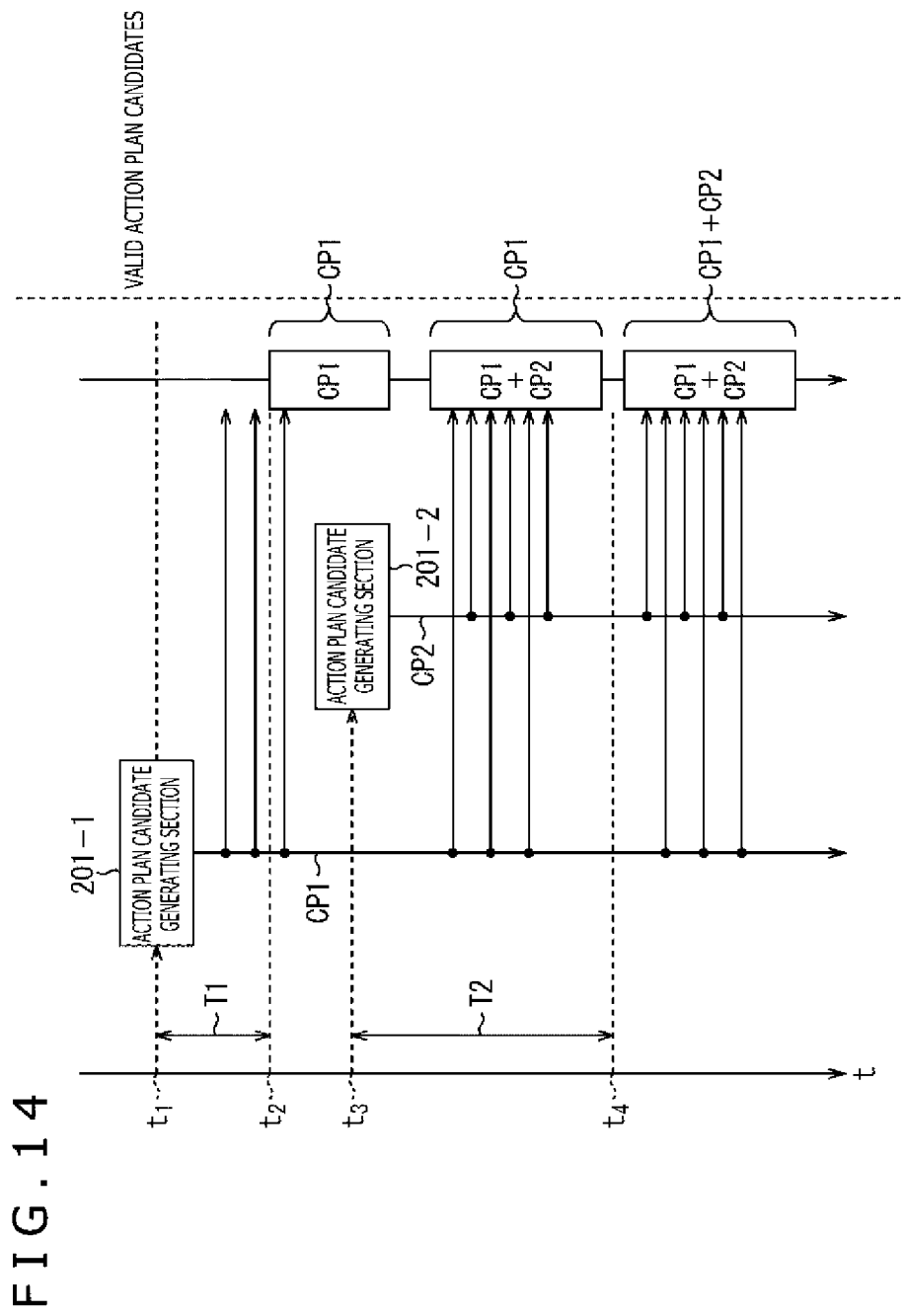
FIG. 14 is an explanatory diagram explaining the action plan determining process involving the use of the planning section depicted in FIG. 10.

It is assumed here, as depicted in FIG. 14, that the action plan candidate generating section 201-1 starts to plan the action plan candidate CP1 at time t1. At this point in time, the action plan candidate generating section 201-2 is not planning any action plan candidate.

The valid action plan candidate determining section 241 considers the action plan candidate CP1 to be a valid action plan candidate after time t2 following elapse of a predetermined time period T1 from time t1 at which the action plan candidate generating section 201-1 started to plan the action plan candidate CP1. Using the valid action plan candidate CP1, the valid action plan candidate determining section 241 determines the action plan.

Then at time t3, with a new own-position candidate added, the action plan candidate generating section 201-2 starts to plan the action plan candidate CP2 on the basis of the second route set corresponding to the second own-position candidate. At this point, the action plan candidate CP2 is low in accuracy and considered invalid, so that the candidate is not used in the action plan determining process. After time t3, the action plan candidate CP1 alone considered valid is used in the action plan determining process.

Further, after time t4 following elapse of a predetermined time period T2 from the time the action plan candidate generating section 201-2 started to plan the action plan candidate CP2 on the basis of the second route set corresponding to the second own-position candidate, the valid action plan candidate determining section 241 considers the action plan candidate CP2 to be also valid. The selection section 211 then determines the action plan by selecting either of the action plan candidates CP1 and CP2 on the basis of their evaluation values, or the merging section 221 determines the action plan by merging the action plan candidates CP1 and CP2 in accordance with their evaluation values.

Explained above was the example in which an action plan candidate is considered invalid depending on the time having elapsed from the time the action plan candidate started to be generated, the action plan candidate being considered valid upon elapse of a predetermined time period. However, because what matters is the reliability of action plan candidates, an action plan candidate planned on the basis of the route planned in accordance with an own-position candidate whose degree of probability is higher than a predetermined value may be considered valid from the time the action plan candidate starts to be planned. Also, whether or not an action plan candidate is used as a valid action plan candidate may be determined through a comprehensive combination of the elapsed time since the planning of the action plan candidate was started and the degree of probability of the action plan candidate.

Further, whether an action plan candidate is valid or invalid may be determined on a basis that also includes other conditions in addition to the elapsed time since the planning of the action plan candidate was started and the degree of probability of the action plan candidate.

Action Plan Determining Process Using the Planning Section in FIG. 13

Figure 15:
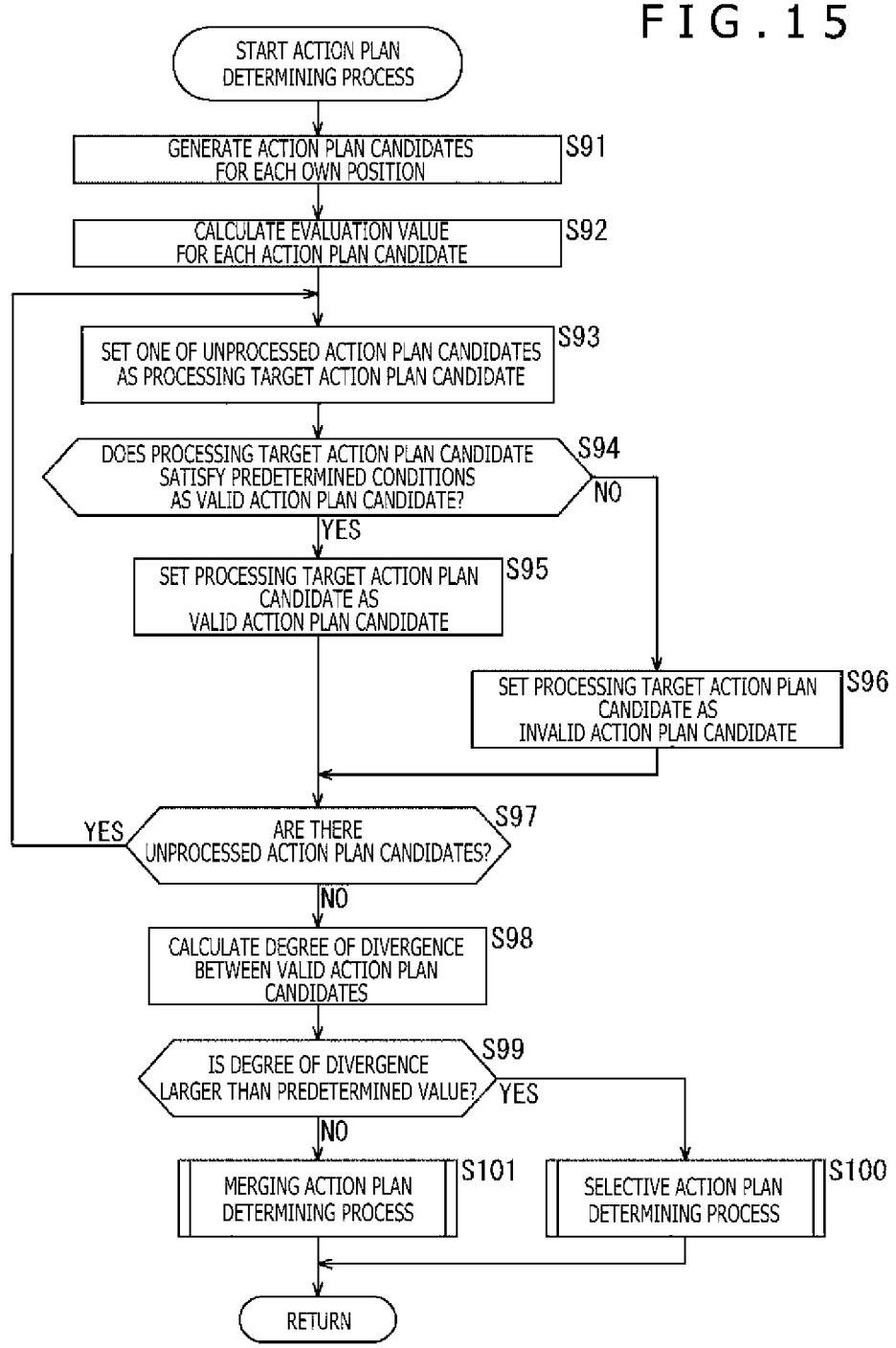
FIG. 15 is a flowchart explaining the action plan determining process involving the use of the planning section depicted in FIG. 10.

The action plan determining process performed by the planning section 134 in FIG. 13 is explained below with reference to the flowchart of FIG. 15.

In step S91, each of the action plan candidate generating sections 201-1 to **201-*n* generates an action plan candidate on the basis of the route planned for each of the own-position candidates. The action plan candidate generating sections 201-1 to 201-*n* output the generated action plan candidates to the action plan candidate evaluating sections 202-1 to 202-*n*** respectively.

In step S92, the action plan candidate evaluating sections 202-1 to **202-*n* set evaluation values to the respective action plan candidates, and output the evaluation values to the action plan determining section 203**.

In step S93, the valid action plan candidate determining section 241 sets one of unprocessed action plan candidates as the action plan candidate targeted for processing.

In step S94, the valid action plan candidate determining section 241 determines whether or not the action plan candidate targeted for processing is a valid action plan candidate satisfying predetermined conditions. More specifically, the valid action plan candidate determining section 241 determines whether or not the action plan candidate targeted for processing is a valid action plan candidate satisfying one or all of such conditions as whether or not the elapsed time from the time the generation of the action plan candidate was started by the action plan candidate generating section 201 is longer than a predetermined time period and whether or not the degree of probability of the corresponding own-position candidate is higher than a predetermined threshold value.

In the case where the action plan candidate is determined to be a valid action plan candidate in step S94, step S95 is reached. In step S95, the valid action plan candidate determining section 241 considers the action plan candidate targeted for processing to be a valid action plan candidate and sets a valid flag thereto.

On the other hand, in the case where the action plan candidate is not determined to be valid in step S94, step S96 is reached. In step S96, the valid action plan candidate determining section 241 considers the action plan candidate targeted for processing to be an invalid action plan candidate and sets an invalid flag thereto.

In step S97, the valid action plan candidate determining section 241 determines whether or not there exists any unprocessed action plan candidate. In the case where there is an unprocessed action plan candidate, control is returned to step S93.

That is, the process of steps S93 to S97 is repeated until all action plan candidates are categorized as either valid or invalid and are flagged correspondingly. In the process of steps S93 to S97, all action plan candidates are categorized as either valid or invalid. In the case where no unprocessed action plan candidate is determined to exist in step S97, control is transferred to step S98.

In step S98, the action plan determining section 203 controls the divergence degree determining section 231 to calculate the degree of divergence between multiple valid action plan candidates.

In step S99, the divergence degree determining section 231 determines whether or not the degree of divergence is higher than a predetermined threshold value, with a significant divergence between the valid action plan candidates. In the case where it is determined in step S99 that the degree of divergence is higher than the predetermined threshold value given a significant divergence between the valid action plan candidates, control is transferred to step S100.

In step S100, given that there is a significant divergence between the multiple valid action plan candidates, the action plan determining section 203 performs the selective action plan determining process. On the basis of the evaluation values of the multiple valid action plan candidates, the action plan determining section 203 selectively determines the valid action plan candidate with the highest (or the lowest) evaluation value as the action plan.

On the other hand, in the case where it is determined in step S99 that the degree of divergence is lower than the predetermined threshold value given the presence of an insignificant divergence, control is transferred to step S101.

In step S101, given that there is an insignificant divergence between the multiple valid action plan candidates, the action plan determining section 203 performs the merging action plan determining process. The action plan determining section 203 determines the action plan by merging the multiple valid action plan candidates on the basis of their evaluation values.

With the processing above carried out, each of multiple action plan candidates is determined to be valid or not depending on such conditions as the elapsed time from the time the generation of the action plan candidate was started and the accuracy of the own position corresponding to the action plan candidate. Only the valid action plan candidates are used in determining the action plan. With the action plan thus determined using only the action plan candidates of which the accuracy levels are higher than a certain level, it is possible to improve the accuracy of the determined action plan. It is also possible to reduce the drop in accuracy of the action plan candidates when the number of own-position candidates is increased halfway during processing so that the action plan candidates with low accuracy levels come to be used.

6. Examples of Execution by Software

The series of processing described above may be executed either by hardware or by software. Where a software-based series of processing is to be carried out, the programs constituting the software may be either incorporated beforehand in the dedicated hardware of a computer or installed from recording media that store the programs into a general-purpose personal computer or like equipment capable of executing diverse functions based on the installed programs.

Figure 16:
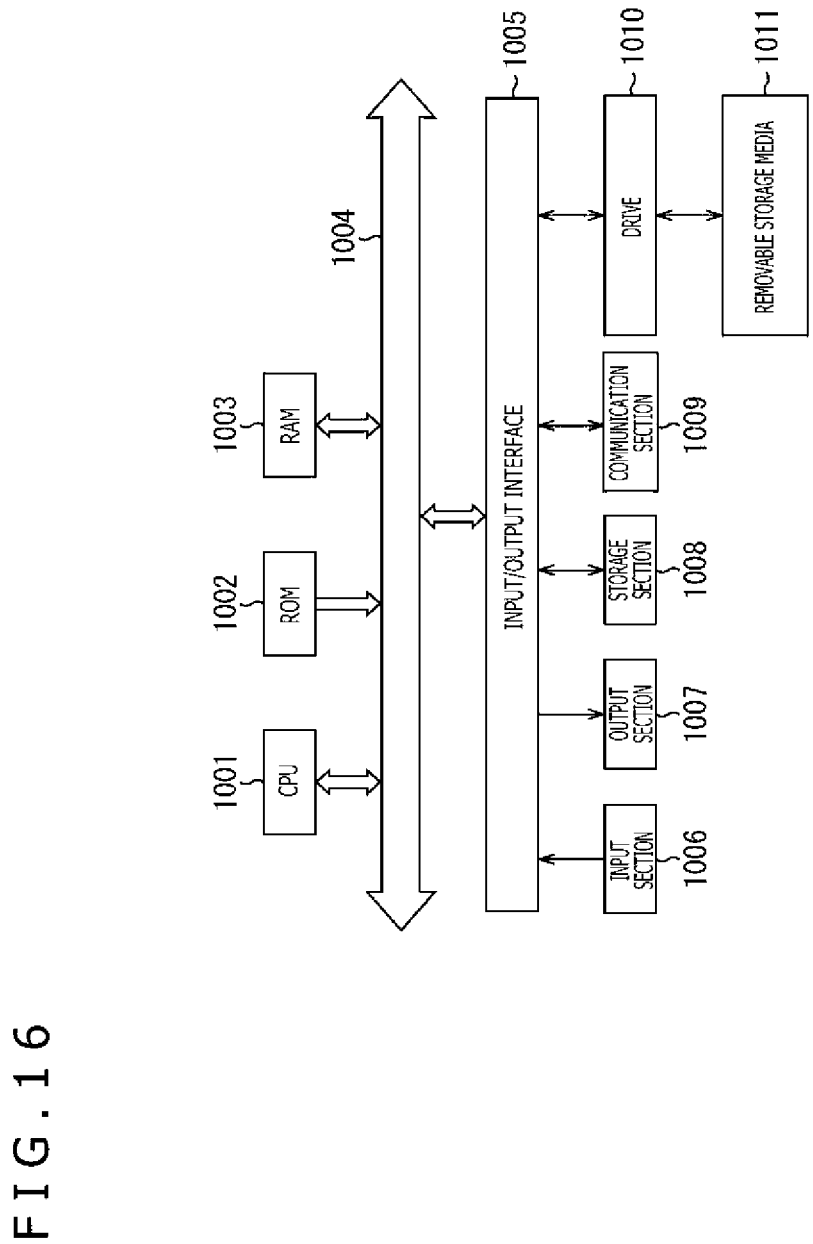
FIG. 16 is an explanatory diagram explaining a typical configuration of a general-purpose computer.

FIG. 16 depicts a typical configuration of a general-purpose computer. This is a personal computer that incorporates a CPU (Central Processing Unit) 1001. The CPU 1001 is connected with an input/output interface 1005 via a bus 1004. The bus 1004 is connected with a ROM (Read Only Memory) 1002 and a RAM (Random Access Memory) 1003.

The input/output interface 1005 is connected with an input section 1006 constituted by such input devices as a keyboard and a mouse by which the user inputs operation commands, an output section 1007 for outputting processing operation screens and processing results to an output device, a storage section 1008 constituted typically by a hard disk drive that stores programs and various data, and a communication section 1009 formed typically by a LAN (Local Area Network) adapter for executing communication processes via networks exemplified by the Internet. The input/output interface 1005 is further connected with a drive 1010 that writes and reads data to and from removable media 1011 such as magnetic disks (including flexible disks), optical disks (including CD-ROM (Compact Disc-Read Only Memory) and DVD (Digital Versatile Disc)), magneto-optical disks (including MD (Mini Disc)), and semiconductor memories.

The CPU 1001 performs various processes in accordance with programs stored in the ROM 1002 or with programs loaded into the RAM 1003 from the storage section 1008 into which the programs have been installed from the removable media 1011 such as a magnetic disk, an optical disk, a magneto-optical disk, or a semiconductor memory. The data needed by the CPU 1001 in carrying out diverse processing may also be stored as needed into the RAM 1003.

In the computer configured as described above, the CPU 1001 performs the above-described series of processing by loading the programs stored in the storage section 1008 from there into the RAM 1003 for execution via the input/output interface 1005 and bus 1004, for example.

The programs to be executed by the computer (CPU 1001) may be recorded on the removable media 1011 such as packaged media when offered, for example. The programs may also be offered via wired or wireless transmission media such as local area networks, the Internet, or digital satellite broadcasting.

In the computer, the programs may be installed into the storage section 1008 from the removable media 1011 attached to the drive 1010 via the input/output interface 1005. The programs may also be installed into the storage section 1008 after being received by the communication section 1009 via wired or wireless transmission media. Alternatively, the programs may be preinstalled in the ROM 1002 or in the storage section 1008.

Incidentally, in this description, the programs for execution by the computer may be carried out chronologically in the depicted sequence, in parallel, or on an as-needed basis such as when they are invoked, for example.

Incidentally, the CPU 1001 in FIG. 16 implements the function of the autonomous movement controlling section 110 in FIG. 3. Also, the storage section 1008 in FIG. 16 implements the storage section 109 in FIG. 3.

Also in this description, the term "system" refers to an aggregate of multiple components (e.g., apparatuses or modules (parts)). It does not matter whether or not all components are housed in the same enclosure. Thus a system may be configured with multiple apparatuses housed in separate enclosures and interconnected via a network, or with a single apparatus that houses multiple modules in a single enclosure.

It is to be understood that the present disclosure when embodied is not limited to the above-described embodiments and that various modifications, variations and alternatives may be made of the disclosure so far as they are within the spirit and scope thereof.

For example, the present disclosure may be implemented as a cloud computing setup in which a single function is processed cooperatively by multiple networked apparatuses on a shared basis.

Also, each of the steps discussed with reference to the above-described flowcharts may be executed either by a single apparatus or by multiple apparatuses on a shared basis.

Furthermore, if a single step includes multiple processes, these processes may be executed either by a single apparatus or by multiple apparatuses on a shared basis.

The present disclosure, when implemented, may be configured preferably as follows:

(1)

A control apparatus including:

an action plan candidate generating section configured to generate multiple candidates of an action plan constituting multiple action plan candidates on a basis of status of surroundings;

an action plan candidate evaluating section configured to assign an evaluation value to each of the generated multiple action plan candidates; and an action plan determining section configured to determine the action plan using the multiple action plan candidates on a basis of the multiple action plan candidates and the evaluation values thereof.

(2)

The control apparatus as stated in paragraph (1) above, in which the action plan candidate generating section generates a candidate of the action plan constituting an action plan candidate for each position estimated as an own position candidate on the basis of the status of surroundings.

(3)

The control apparatus as stated in paragraph (1) or (2) above, in which the action plan candidate evaluating section assigns an evaluation value to each of the generated multiple action plan candidates on a basis of a degree of probability of the position estimated as an own position candidate on the basis of the status of surroundings.

(4)

The control apparatus as stated in paragraph (3) above, in which the own position estimated on the basis of the status of surroundings is done so by matching feature points acquired from a camera-captured image against a preliminary knowledge, and the degree of probability of the position is defined by the number of matched feature points.

(5)

The control apparatus as stated in paragraph (1) above, in which the action plan determining section further includes a selection section configured to select one of the multiple action plan candidates on a basis of the evaluation values thereof, and the action plan determining section determines as the action plan the action plan candidate selected by the selection section.

(6)

The control apparatus as stated in paragraph (5) above, in which the selection section selects the action plan candidate having the best evaluation value from the multiple action plan candidates on the basis of the evaluation values thereof, and the action plan determining section determines as the action plan the action plan candidate selected by the selection section.

(7)

The control apparatus as stated in paragraph (1) above, in which the action plan determining section further includes a merging section configured to merge the multiple action plan candidates on the basis of the evaluation values thereof, and the action plan determining section determines as the action plan the action plan candidate obtained by the merging section merging the multiple action plan candidates.

(8)

The control apparatus as stated in paragraph (7) above in which, given elements of coordinates defining passing points forming paths that constitute the multiple action plan candidates, the merging section merges the action plan candidates into a new action plan candidate having a path moving through new passing points each being a position of center of gravity obtained by weighting each of the elements with the corresponding evaluation value, and the action plan determining section determines as the action plan the new action plan candidate thus generated by the merging section merging the multiple action plan candidates.

(9)

The control apparatus as stated in paragraph (1) above, in which the action plan determining section calculates a degree of divergence between the multiple action plan candidates and, in accordance with the degree of divergence, determines the action plan using the multiple action plan candidates on the basis of the evaluation values thereof.

(10)

The control apparatus as stated in paragraph (9) above, in which the action plan determining section further includes:

a selection section configured to select one of the multiple action plan candidates on the basis of the evaluation values thereof;

a merging section configured to merge the multiple action plan candidates on the basis of the evaluation values thereof; and a divergence degree determining section configured to calculate a degree of divergence between the multiple action plan candidates and, in accordance with the degree of divergence, determine whether one of the multiple action plan candidates is to be selected on the basis of the evaluation values thereof by the selection section, or the multiple action plan candidates are to be merged on the basis of the evaluation values thereof, in order to determine the action plan.

(11)

The control apparatus as stated in paragraph (10) above in which, in the case where the multiple action plan candidates are each represented by a vector, the divergence degree determining section calculates a difference between weighted vectors as the degree of divergence.

(12)

The control apparatus as stated in paragraph (11) above, in which the divergence degree determining section normalizes magnitudes of the vectors representing the multiple action plan candidates, before calculating the difference between the weighted vectors as the degree of divergence.

(13)

The control apparatus as stated in paragraph (10) above in which, in the case where the multiple action plan candidates are each formed by a path moving through multiple passing points, the divergence degree determining section forms vectors between the passing points and, using the vectors thus formed, calculates a difference between weighted vectors as the degree of divergence.

(14)

The control apparatus as stated in paragraph (10) above in which, in the case where the action plan candidates are each formed by a path moving through multiple passing points, the divergence degree determining section calculates a sum of differences in distance between the passing points as the degree of divergence.

(15)

The control apparatus as stated in paragraph (10) above, in which the action plan determining section further includes a valid action plan candidate determining section configured to determine, from among the multiple action plan candidates, a valid action plan candidate satisfying a predetermined condition, and the divergence degree determining section calculates a degree of divergence between the valid action plan candidates from among the action plan candidates and, in accordance with the degree of divergence, determines whether one of the multiple valid action plan candidates is to be selected on the basis of the evaluation values thereof by the selection section, or the multiple valid action plan candidates are to be merged on the basis of the evaluation values thereof, in order to determine the action plan.

(16)

The control apparatus as stated in paragraph (15) above in which, given the multiple action plan candidates, the valid action plan candidate determining section determines, as a valid action plan candidate satisfying the predetermined condition, an action plan candidate for which a predetermined time period has elapsed after the generation of the action plan candidate was started by the action plan candidate generating section.

(17)

The control apparatus as stated in paragraph (15) above in which, given the multiple action plan candidates, the valid action plan candidate determining section determines an action plan candidate having a predetermined degree of probability as a valid action plan candidate satisfying the predetermined condition.

(18)

The control apparatus as stated in any one of paragraphs (1) to (17) above, further including:

a route plan generating section configured to generate a route plan to a destination from each position constituting an own-position candidate on the basis of the status of surroundings, in which the action plan candidate generating section generates a candidate of the action plan constituting an action plan candidate on a basis of the route plan generated with respect to each position constituting an own-position candidate.

(19)

A control method including:

an action plan candidate generating process configured to generate multiple candidates of an action plan constituting multiple action plan candidates on a basis of status of surroundings;

an action plan candidate evaluating process configured to assign an evaluation value to each of the generated multiple action plan candidates; and an action plan determining process configured to determine the action plan using the multiple action plan candidates on a basis of the multiple action plan candidates and the evaluation values thereof.

(20)

A program for causing a computer to implement functions including:

an action plan candidate generating process configured to generate multiple candidates of an action plan constituting multiple action plan candidates on a basis of status of surroundings;

an action plan candidate evaluating process configured to assign an evaluation value to each of the generated multiple action plan candidates; and an action plan determining process configured to determine the action plan using the multiple action plan candidates on a basis of the multiple action plan candidates and the evaluation values thereof.

(21)

A mobile object including:

an action plan candidate generating section configured to generate multiple candidates of an action plan constituting multiple action plan candidates on a basis of status of surroundings;

an action plan candidate evaluating section configured to assign an evaluation value to each of the generated multiple action plan candidates;

an action plan determining section configured to determine the action plan using the multiple action plan candidates on a basis of the multiple action plan candidates and the evaluation values thereof; and a control section configured to control motions of the mobile object on a basis of the action plan determined by the action plan determining section.

REFERENCE SIGNS LIST

11 Mobile object
21 Sensor group
21a, 21a-1 to 21a-n Sensors
22 Autonomous movement controlling section
23 Actuator group
23a, 23a-1 to 23a-n Actuators
31 Recognition processing section
32 Action plan processing section
33 Action control processing section
41 Route planning section
42 Action planning section
43 Motion planning section
102 Data acquiring section
105 Output controlling section
106 Output section
107 Drive train controlling section
108 Drive train system
110 Autonomous movement controlling section
112 Sensor group
113 Actuator group
121 Recognition processing section
122 Action plan processing section
123 Action control processing section
134 Planning section
161 Route planning section
162 Action planning section
163 Motion planning section
201, 201-1 to 201-n Action plan candidate generating sections
202, 202-1 to 202-n Action plan candidate evaluating sections
203 Action plan determining section
211 Selection section
221 Merging section
231 Divergence degree determining section
241 Valid action plan candidate determining section

The invention claimed is:

1. An apparatus including a central processing unit configured to execute programs, comprising:

a section configured to obtain one own-position in a case that it is suitable to determine one own-position from plural own-position candidates and obtain plural own-position candidates in a case that it is not suitable to determine one own-position from plural own-position candidates;

an action plan candidate generator configured to generate a plurality of action plan candidates for each of the own-position candidates based on a status of surroundings;

an action plan candidate evaluator configured to assign an evaluation result to each of the plurality of action plan candidates, the evaluation result generated based on prepared map information and surrounding environment;

an action plan determiner configured to determine an action plan based on the plurality of action plan candidates and the evaluation results thereof;

wherein the action plan determiner includes:

a selector configured to select one of the plurality of action plan candidates based on the evaluation results thereof;

a merger configured to merge the plurality of action plan candidates based on the evaluation results thereof;

a divergence degree determiner configured to calculate a degree of divergence between the plurality of action plan candidates and, in accordance with the degree of divergence, determine whether one of the plurality of action plan candidates is to be selected on the basis of the evaluation results thereof by the selector, or the plurality of action plan candidates are to be merged on the basis of the evaluation results thereof, in order to determine the action plan; and a valid action plan candidate determiner configured to determine, from among the plurality of action plan candidates, one or more valid action plan candidates satisfying a predetermined condition, wherein the divergence degree determiner calculates a degree of divergence between the one or more valid action plan candidates from among the multiple action plan candidates and, in accordance with the degree of divergence, determines whether one of the one or more valid action plan candidates is to be selected on the basis of the evaluation results thereof by the selector, or the one or more valid action plan candidates are to be merged on the basis of the evaluation values thereof, in order to determine the action plan, and wherein the valid action plan candidate determiner is configured to determine, as a valid action plan candidate satisfying the predetermined condition, an action plan candidate for which a predetermined time period has elapsed after generation of the action plan candidate was started by the action plan candidate generator; and
a controller configured to control motions of a mobile object on a basis of the action plan determined by the action plan determiner.

2. The apparatus according to claim 1, wherein the action plan candidate generator generates the action plan candidate of the plurality of action plan candidates for each position estimated as an own-position candidate based on the status of the surroundings.

3. The apparatus according to claim 1, wherein the action plan candidate evaluator assigns the evaluation result to each of the plurality of action plan candidates based on a probability of an own-position candidate based on the status of surroundings.

4. The apparatus according to claim 3, wherein the own-position candidate estimated based on the status of surroundings is determined by matching feature points acquired from a camera-captured image with a preliminary knowledge, and the probability of the own-position candidate is based on the number of matched feature points.

5. The apparatus according to claim 1, wherein the action plan determiner is configured to determine as the action plan the action plan candidate selected by the selector.

6. The apparatus according to claim 5, wherein the selector is configured to select the action plan candidate having the best evaluation result of the plurality of action plan candidates.

7. The apparatus according to claim 1, wherein the action plan determiner is configured to determine as the action plan the action plan candidate obtained by the merger merging the plurality of action plan candidates.

8. The apparatus according to claim 7, wherein, each of the plurality of action plan candidates comprises elements of coordinates defining a plurality of passing points that form a path, and the merger is configured to merge the plurality of action plan candidates into a new action plan candidate having a path passing through a plurality of new passing points, each of the plurality of new passing points being a center of gravity position obtained by weighting each of the elements of coordinates with a value based on a corresponding evaluation result.

9. The apparatus according to claim 1, wherein the action plan determiner is configured to determine the action plan based, at least in part, on the degree of divergence.

10. The apparatus according to claim 1, wherein the each of the plurality of action plan candidates is represented by a vector, and the divergence degree determiner calculates the degree of divergence based on the vectors.

11. The apparatus according to claim 10, wherein each vector is associated with a weight value and the divergence degree determiner calculates the degree of divergence based on the weight values.

12. The apparatus according to claim 1, wherein each of the plurality of action plan candidates includes a path passing through a plurality of passing points, and the divergence degree determiner forms a plurality of vectors between the passing points and, using the plurality of vectors thus formed, calculates the degree of divergence.

13. The apparatus according to claim 12, wherein, each of the plurality of vectors is associated with a weight value and the divergence degree determiner calculates the degree of divergence based on the weight values.

14. The apparatus according to claim 1, wherein the valid action plan candidate determiner is configured to determine an action plan candidate having a predetermined probability as a valid action plan candidate satisfying the predetermined condition.

15. The apparatus according to claim 1, further comprising: a route plan generator configured to generate a route plan to a destination from each position constituting an own-position candidate based on the status of the surroundings, wherein the action plan candidate generator is configured to generate an action plan candidate based on the route plan generated with respect to each position constituting an own-position candidate.

16. A method comprising:
obtaining one own-position in a case that it is suitable to determine one own-position from plural own-position candidates and obtaining own-position candidates in a case that it is not suitable to determine one own-position from plural own-position candidates;
generating a plurality of action plan candidates for each of the own-position candidates based on a status of surroundings;
assigning an evaluation result to each of the plurality of action plan candidates, the evaluation result generated based on prepared map information and surrounding environment; and
determining an action plan based on the plurality of action plan candidates and the evaluation results thereof;
wherein the determining of the action plan includes:
selecting one of the plurality of action plan candidates based on the evaluation results thereof;
merging the plurality of action plan candidates based on the evaluation results thereof;
calculating a degree of divergence between the plurality of action plan candidates and, in accordance with the degree of divergence, determining whether one of the plurality of action plan candidates is to be selected on the basis of the evaluation results thereof by the selector, or the plurality of action plan candidates are to be merged on the basis of the evaluation results thereof, in order to determine the action plan; and
determining, from among the plurality of action plan candidates, one or more valid action plan candidates satisfying a predetermined condition, wherein the calculating of the degree of divergence comprises calculating a degree of divergence between the one or more valid action plan candidates from among the multiple action plan candidates and, in accordance with the degree of divergence, determining whether one of the one or more valid action plan candidates is to be selected on the basis of the evaluation results thereof by the selector, or the one or more valid action plan candidates are to be merged on the basis of the evaluation values thereof, in order to determine the action plan, and determining, as a valid action plan candidate satisfying the predetermined condition, an action plan candidate for which a predetermined time period has elapsed after generation of the action plan candidate was started by the action plan candidate generator; and
controlling motions of a mobile object on a basis of the action plan determined by the action plan determiner.

17. At least one non-transitory storage medium encoded with executable instructions that, when executed by at least one central processing unit, cause the at least one central processing unit to carry out a method, wherein the method comprises:

obtaining one own-position in a case that it is suitable to determine one own-position from plural own-position candidates and obtaining plural own-position candidates in a case that it is not suitable to determine one own-position from plural own-position candidates;

generating a plurality of action plan candidates for each of the own-position candidates based on a status of surroundings;

assigning an evaluation result to each of the plurality of action plan candidates, the evaluation result generated based on prepared map information and surrounding environment; and determining an action plan based on the plurality of action plan candidates and the evaluation results thereof;

wherein the determining of the action plan includes:

selecting one of the plurality of action plan candidates based on the evaluation results thereof;

merging the plurality of action plan candidates based on the evaluation results thereof;

calculating a degree of divergence between the plurality of action plan candidates and, in accordance with the degree of divergence, determining whether one of the plurality of action plan candidates is to be selected on the basis of the evaluation results thereof by the selector, or the plurality of action plan candidates are to be merged on the basis of the evaluation results thereof, in order to determine the action plan; and determining, from among the plurality of action plan candidates, one or more valid action plan candidates satisfying a predetermined condition, wherein the calculating of the degree of divergence comprises calculating a degree of divergence between the one or more valid action plan candidates from among the multiple action plan candidates and, in accordance with the degree of divergence, determining whether one of the one or more valid action plan candidates is to be selected on the basis of the evaluation results thereof by the selector, or the one or more valid action plan candidates are to be merged on the basis of the evaluation values thereof, in order to determine the action plan, and determining, as a valid action plan candidate satisfying the predetermined condition, an action plan candidate for which a predetermined time period has elapsed after generation of the action plan candidate was started by the action plan candidate generator; and controlling motions of a mobile object on a basis of the action plan determined by the action plan determiner.

18. A mobile object comprising:

a section configured to obtain one own-position in a case that it is suitable to determine one own-position from plural own-position candidates and obtain plural own-position candidates in a case that it is not suitable to determine one own-position from plural own-position candidates;

an action plan candidate generator configured to generate a plurality of action plan candidates for each of the own-position candidates based on a status of surroundings;

an action plan candidate evaluator configured to assign an evaluation result to each of the plurality of action plan candidates, the evaluation result generated based on prepared map information and surrounding environment;

an action plan determiner configured to determine an action plan based on the plurality of action plan candidates and the evaluation results thereof;

wherein the action plan determiner includes:

a selector configured to select one of the plurality of action plan candidates based on the evaluation results thereof;

a merger configured to merge the plurality of action plan candidates based on the evaluation results thereof;

a divergence degree determiner configured to calculate a degree of divergence between the plurality of action plan candidates and, in accordance with the degree of divergence, determine whether one of the plurality of action plan candidates is to be selected on the basis of the evaluation results thereof by the selector, or the plurality of action plan candidates are to be merged on the basis of the evaluation results thereof, in order to determine the action plan; and a valid action plan candidate determiner configured to determine, from among the plurality of action plan candidates, one or more valid action plan candidates satisfying a predetermined condition, wherein the divergence degree determiner calculates a degree of divergence between the one or more valid action plan candidates from among the multiple action plan candidates and, in accordance with the degree of divergence, determines whether one of the one or more valid action plan candidates is to be selected on the basis of the evaluation results thereof by the selector, or the one or more valid action plan candidates are to be merged on the basis of the evaluation values thereof, in order to determine the action plan, and wherein the valid action plan candidate determiner is configured to determine, as a valid action plan candidate satisfying the predetermined condition, an action plan candidate for which a predetermined time period has elapsed after generation of the action plan candidate was started by the action plan candidate generator; and a controller configured to control motions of the mobile object on a basis of the action plan determined by the action plan determiner.

* * * * *